United States Patent [19]

Rudolph

[11] 4,165,609

[45] Aug. 28, 1979

[54] GAS TURBINE MIXER APPARATUS

[75] Inventor: Peter K. C. Rudolph, Seattle, Wash.

[73] Assignee: The Boeing Company, Seattle, Wash.

[21] Appl. No.: 773,530

[22] Filed: Mar. 2, 1977

[51] Int. Cl.$^2$ .............................................. F02K 3/06
[52] U.S. Cl. .................................... 60/262; 181/213; 181/220; 239/265.17
[58] Field of Search .................. 60/262; 181/213, 220; 239/269.17

[56] References Cited

U.S. PATENT DOCUMENTS

| | | | |
|---|---|---|---|
| 3,048,376 | 8/1962 | Howald et al. | 60/262 |
| 3,065,818 | 11/1962 | Lombard et al. | 181/213 |
| 3,092,205 | 6/1963 | Brown et al. | 181/213 |
| 3,289,413 | 12/1966 | Gist | 60/262 |

*Primary Examiner*—Robert E. Garrett
*Attorney, Agent, or Firm*—Christensen, O'Connor, Johnson & Kindness

[57] ABSTRACT

Fluid mixing apparatus for mixing the coaxially flowing streams of fan air and primary exhaust within a turbofan engine are disclosed. Each of the disclosed arrangements include a generally tubular mixer section that extends axially rearward from the engine turbine flange. The mixing apparatus includes axially extending regions in which contiguous portions of the fan stream are induced to flow radially inward to penetrate the primary flowstream and includes axially extending regions in which contiguous portions of the primary flowstream are induced to flow radially outward to penetrate the fan stream. The regions inducing the outwardly directed flow of the primary flowstream and the regions inducing the inwardly directed flow of the fan stream are circumferentially interspersed with one another to establish a flow pattern which causes mixing to occur along the axial length of the mixing apparatus and causes mixing to continue within a common exhaust duct located aft of the mixing apparatus. In some of the disclosed arrangements, a series of deflection vanes are positioned across each of the regions that divert the fan flowstream and each of the regions that divert the primary flowstream. In other arrangements, only the regions for diverting fan flow or the regions for diverting primary flow include such deflection vanes. In each arrangement an annular free mixing boundary is formed along the forward portion of the mixing apparatus to minimize the effect of the mixer geometry on the engine cycle of the gas turbine engine in which the apparatus is employed.

12 Claims, 25 Drawing Figures

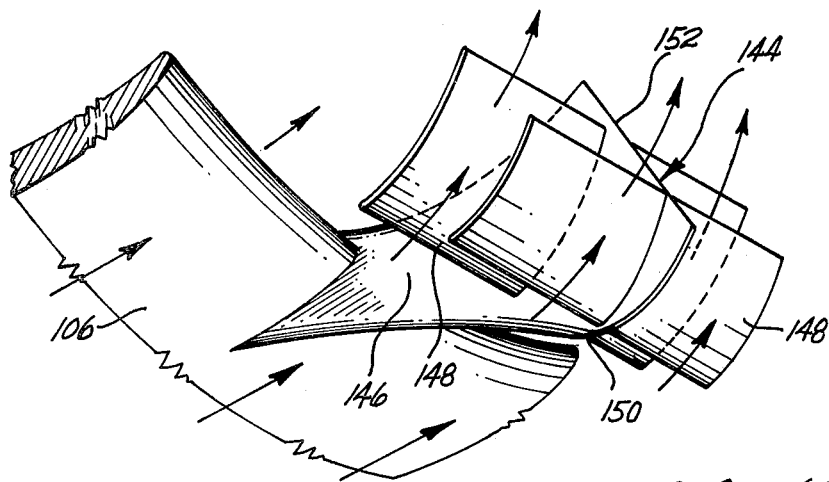
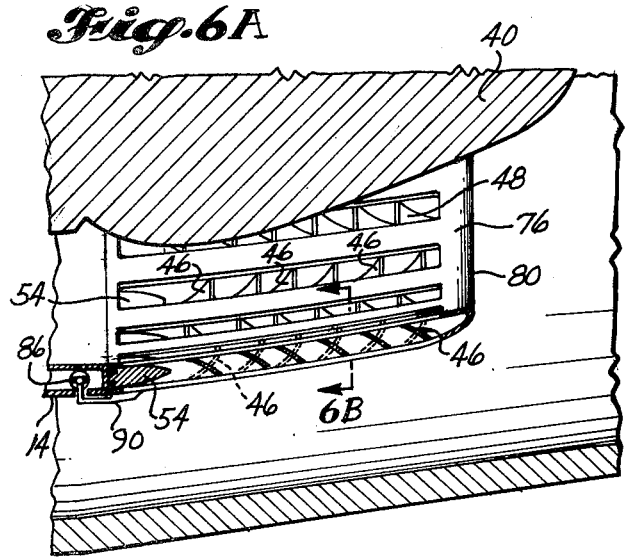
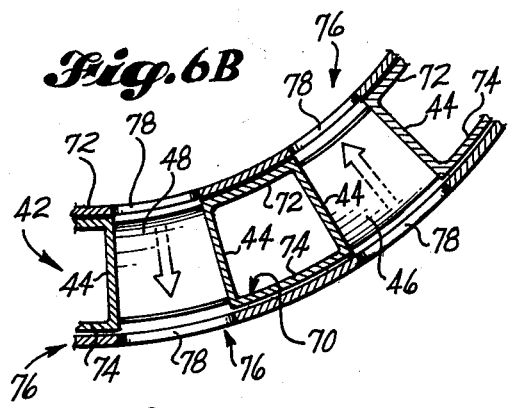
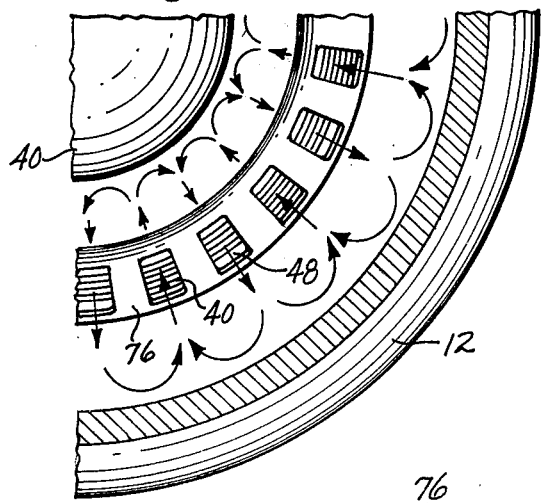
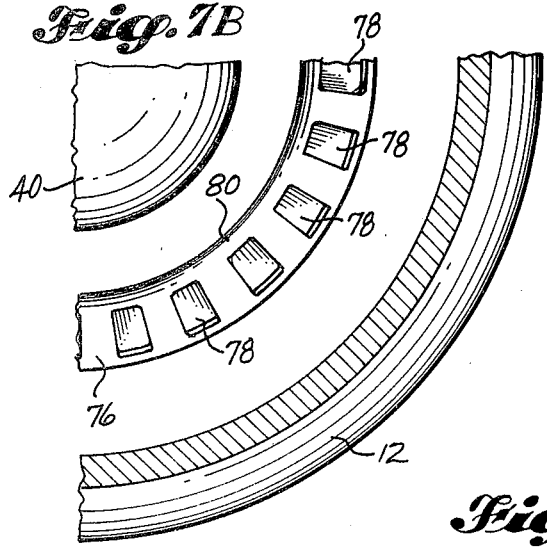

GAS TURBINE MIXER APPARATUS

BACKGROUND OF THE INVENTION

This invention relates to flow mixers for mixing concentric fluid streams. More particularly, this invention relates to improved apparatus for efficiently and rapidly mixing the primary and bypass streams of a gas turbine engine of the turbofan variety.

As is known in the art, a turbofan engine includes a gas generator which supplies a primary fluid stream comprising high energy combustion products and at least one fan stage which compresses ambient air to supply a secondary stream of "by-pass air".

Many of these turbofan engines are of the common exhaust variety wherein the primary fluid stream and the secondary fluid stream merge within a common exhaust duct and are exhausted into the atmosphere to produce forwardly directed thrust. In such a turbofan engine, the gas generator is included within a core engine to produce high temperature, high pressure, combustion products that are expanded through one or more turbine stages to develop shaft horsepower for rotating one or more high pressure axial compressor stages and one or more fan stages. The fan stages, which receive ambient air, act as a low pressure compressor to deliver air to the inlet of the high pressure axial compressor stages, which, in turn, compress the air for delivery to the gas generator. A portion of the airstream delivered by the fan stages is bypassed around the engine core such that the bypass or fan air coaxially surrounds the combustion products or primary flowstream as the two flowstreams pass rearwardly into a common exhaust duct. The two flowstreams mix partially with one another within the exhaust duct and flow therefrom to produce forwardly directed thrust.

If thorough mixing of the two fluid streams is to be achieved within a relatively short distance, such common exhaust turbofan engines require a mixer assembly that either forms the terminating portion of a common boundary wall that separates the two fluid streams from one another, or is mounted directed downstream of the terminating edge of such a common boundary wall.

The mixing of the fan air with the turbine exhaust gases can increase the engine thrust over that which would be produced by exhausting unmixed fluid streams having a substantially identical exhaust pressure, total mass flow, and total energy. This increase in thrust arises since the mixed gases have a higher mass-velocity product than that which would be produced by separately exhausting the two fluid streams. Further, and of prime significance with respect to this invention, mixing the fan air with the turbine exhaust gases can decrease engine noise. More specifically, one component of gas turbine noise commonly called "jet noise" results from pressure disturbances created at the flow boundaries or interface between a high velocity jet stream and the surrounding atmosphere. In this respect, it has been determined that the jet noise produced by a high velocity, singlestream discharge is proportional to the relative velocity between the jet stream and the ambient atmosphere exponentially raised to a relatively high power (typically 8). In a turbofan engine wherein the primary and fan air streams are not caused to thoroughly mix with on another within the common exhaust duct, the velocity of the primary fluid stream is typically 1.4 to 1.7 times greater than the velocity of the fan air stream. Consequently the major contribution to the jet noise is caused by the relatively high velocity primary fluid stream. On the other hand, mixing the primary fluid stream with the fan air within the common exhaust duct substantially reduces the velocity of the thrust-producing fluid stream that is discharged into the atmosphere, substantially reducing the jet noise.

A variety of mixer arrangements for forcing the two fluid streams to mix with one another prior to discharge into the atmosphere are known to the art. In general, these prior art mixers are arranged to reconfigure the cross-sectional flow pattern of the two fluid streams such that, when the fluid streams pass rearwardly over the aft terminus of the mixer, the area of the interface between the two fluid streams is increased over the interface area which would be present if the two streams were discharged in coaxial relationship with one another. Increasing the interface region between contiguous portions of the two flow streams effectively brings a greater portion of each fluid stream into "contact" with the other fluid stream and increases mixing since axial shear forces are introduced throughout such boundary or interface regions. Additionally, such prior art mixing apparatus may impart a radial velocity component to both fluid streams that further enhances mixing when the two fluid streams flow rearwardly from the aft terminus of the mixer. For example, in an arrangement disclosed in U.S. Pat. No. 3,289,413 issued to W. B. Gist, Jr., a mixer is arranged to effect an inwardly directed radial velocity component in portions of the fan airstream and an outwardly directed radial velocity component in interspersed portions of the primary stream as two flowstreams pass axially along the mixing apparatus. Aft of the mixer terminus, these oppositely directed radial components effectively cause radial shear forces at the interface between the two flowstreams and hence cause the two fluids to mix with one another.

The most widely known prior art mixer is commonly called a lobed mixer or daisy mixer. A daisy mixer includes a tubular mixer section having a number of axially extending, circumferentially spaced-apart lobes or corrugations of increasing radial dimension relative to the mixer length. This mixer section is coaxially mounted within a generally cylindrical outer duct and, in gas turbine engines which include a rearwardly extending tail plug, coaxially surrounds the tail plug. The primary fluid stream, exhausted by the turbine stages, flows through an annular passage formed between the exterior surface of the tail plug and the interior surface of the mixer section and the fan air flows through an annular passage formed between the inner surface of the outer duct and the outer surface of the mixer section. The outer duct extends rearwardly beyond the aft terminus or mixing plane of the mixer section to form a common exhaust duct or mixing chamber. As the fluid streams flow along the mixer section, the cross-sectional pattern of the duct containing the primary fluid stream takes on a generally star-shaped or daisy petal geometry. Thus, as the two fluid streams come together at the mixer section exit plane, the primary fluid stream effectively includes a plurality of radially extending, rearwardly directed fluid streams interspersed between regions of flowing fan air. The mixing of the two fluid streams is enhanced by the increased interface area between the two fluid streams and occurs as the fluid streams travel through the common exhaust duct or mixing chamber.

Several disadvantages and drawbacks are experienced with respect to prior art mixers such as the daisy mixer. First, since the mixer section must redirect the two flowstreams to form flow patterns having a relatively large interface area between contiguous portions of the flowstreams, and since no mixing occurs prior to the point at which the flowstreams pass over the aft terminus or exit plane of the mixer section, the prior art mixers must be of a considerable axial length if thorough mixing is to be achieved. Such substantial axial length not only imposes design constraints relative to new engine configurations, but often prevents the design of improved noise suppressing mixers for utilization with an existing engine installation. With respect to gas turbine powered aircraft, such retrofit designs are of increasing importance since governmentally imposed noise limitations must often be met not only by newly designed engines, but also by the engines of aircraft presently in service. In this regard, if suitable noise abatement modifications cannot be effected on existing aircraft engines, these engines can become totally unusable, or at the very least, limited in service application. Further, the relatively long prior art mixers are susceptible to failure induced by metal fatigue arising at least in part because of the high temperature environment and vibration incumbent in the operation of a gas turbine engine. Specifically, since the lobes of a daisy mixer have relatively flat sidewalls with little or no pressure differential being produced across the sidewalls during operation of the engine, the sidewalls are especially susceptable to flutter and fatigue. Additionally, due to the substantial axial length, such prior art mixers are generally quite heavy and thus can cause a weight penalty that detracts from the operating efficiency and overall performance of the aircraft. Even further, both the intial fabrication cost and the repair costs for such prior art mixers are relatively high due to the complex geometry and welded seams necessary therein.

Other performance penalties often result from the use of prior art mixers. For example, since the necessary redirection of the fluid streams to effect the interspersion of the primary fluid stream with the fan air takes place over the relatively long mixer section, substantial pressure losses are often caused in both fluid streams. These pressure losses can prevent attainment of the previously described gain in thrust that is theoretically possible by mixing the fluid streams. In fact, such pressure losses may result in less thrust than is potentially available in a comparable turbofan engine of the unmixed flow variety. Further, each gas turbine engine is designed to operate with a predetermined thermodynamic cycle. Thus to prevent performance degradation, a mixer section must match the engine cycle of the particular engine in which the mixer is employed. With respect to prior art mixers such as the daisy mixer, the engine cycle matching characteristics are primarily determined by discharge coefficients that are associated with the cross-sectional geometry of the mixer exit plane. Since the cross-sectional geometry of the exit plane is rather complex, these discharge coefficients of the prior art mixers cannot generally be determined by theoretical considerations and a great deal of experimental effort is generally necessary to determine the optimum mixer configuration. Thus, although prior art mixers such as the daisy mixer have been subject to a great deal of experimental and developmental effort to overcome the above described disadvantages and drawbacks, widespread practical application of these mixers to gas tubine powered aircraft has not been achieved.

Accordingly, it is an object of this invention to provide mixing apparatus of relatively short axial length for thoroughly and efficiently mixing two concentric fluid streams.

It is another object of this invention to provide a gas turbine mixer for mixing fan air with primary combustion gasses to greatly decrease the jet noise produced by the gas turbine engine.

It is yet another object of this invention to provide a relatively lightweight flow mixer of relatively short axial length that is usable within a variety of exiting and newly-designed gas turbine engines.

It is still another object of this invention to provide a mixer for a gas turbine engine of the turbofan variety wherein the mixer has minimal effect on the engine cycle match.

SUMMARY OF THE INVENTION

These and other objects are achieved in accordance with this invention by fluid mixing apparatus in which axially extending and circumferentially interspersed regions of the coaxially flowing fan stream and primary flowstream are caused to penetrate into the opposite flowstream as the flowstreams pass axially along the length of the mixing apparatus. More specifically, each embodiment of the invention is mounted to extend axially rearward from the aft terminus of a common boundary wall (e.g., the primary nozzle of the engine) that separates the rearwardly flowing primary flowstream from the rearwardly flowing annular fan stream which coaxially surrounds the primary flowstream. Axially extending segments of each mixer embodiment divert contiguous regions of fan air radially inward to penetrate the rearwardly directed primary flowstream and/or divert contiguous regions of the rearwardly directed primary flowstream radially outward to penetrate the rearwardly flowing fan flowstream. The diversion of the two fluid streams is effected by a series of deflection vanes (herein referred to as a "cascade") which are mounted in spaced-apart relationship between adjacent axially and/or radially extending support members. The support members are mounted to and project from an annular free mixer formed at the forward entrance region of the mixing apparatus.

In those arrangements of the invention including deflection vanes for diverting fan air (fan cascades) and deflection vanes for diverting the primary flowstream (primary cascades), the primary cascades and the fan cascades are alternately interspersed with one another around the periphery of the mixing apparatus. In one such arrangement, the interspersed fan and primary cascades define a substantially tubular or slightly conical outline that is coaxially mounted within a common exhaust duct or mixing chamber. In embodiments in which the gas turbine engine includes a rearwardly projecting tail cone, the mixer coaxially surrounds the tail cone.

Thus, as the primary flowstream and fan airstream flow axially along the mixer, portions of each flowstream are radially diverted into the other flowstream and partial mixing occurs along the length of the mixer. The partially mixed flow pattern, established as the fluid streams flow along the mixer, includes axial shear regions, radial shear regions, and vortical flow regions that cause mixing to continue after the fluid streams pass the aft terminus of the mixer and flow through the common exhaust duct or mixer chamber.

The above described arrangements can include rotatable or retractable cover units for use in embodiments wherein it is desirable to cover the fan cascades and primary cascades during certain flight modes. More explicitly, in embodiments wherein the mixer effects pressure losses that cause a thrust penalty during operation of the aircraft in the cruise regime, the rotatable or retractable covers can be operated to expose the cascades only when noise suppression is required, e.g., during takeoff and landing maneuvers.

In one of these embodiments, wherein the mixer is of a substantially cylindrical shape, telescoping cylindrical covers are retractable to nest over the forwardly positioned free mixer and expose the axially extending cascades. When noise suppression is not desired or necessary, the telescoping cylindrical covers can be slid aft to enclose the cascades and effectively form annular ducts for the rearwardly flowing fan air and primary flowstream. In another embodiment wherein the mixer substantially defines a hollow, truncated conical section, adjacent fan cascades and primary cascades are separated by axially extending beams or strongbacks having substantially the same width or angle of inclusion as the fan and primary cascades. A rotatable shroud, having axially extending, spaced-apart slots that are dimensioned to correspond to the dimensions of the cascades, encases the mixer. This shroud can be rotated such that the axially extending slots expose the cascades to the fan stream and primary stream (noise suppression mode) or rotated such that the cascades are covered by regions of the shroud that separate the axially extending slots (cruise or non-noise suppressing mode).

In other embodiments of the invention, only fan cascades or primary cascades are employed with the cascades being circumferentially spaced-apart from one another to define axially extending open regions between adjacent cascades. In these embodiments, either regions of the primary flowstream that are contiguous to the primary cascades or regions of the fan flowstream that are contiguous to the fan cascades, are caused to penetrate the opposite flowstream. The forced penetration of regions of one flowstream into the second flowstream causes flow displacement that induces radially directed flow of the second fluid stream through the axially extending open regions. Thus, as in the embodiments utilizing both fan cascades and primary cascades, regions of axial shear flow, radial shear flow, and vortical flow are established along the length of the mixer to partially mix the two fluid streams. As in the case in the embodiments employing both types of cascades, mixing continues as the fluids flow past the aft terminus of the mixer.

BRIEF DESCRIPTION OF THE DRAWINGS

Other objects and advantages of the present invention will become apparent to one skilled in the art after a reading of the following description taken together with the accompanying drawings, in which:

FIGS. 6a, 6b and 6c depict an embodiment of the invention having a rotatable cover assembly to permit operation in a noise suppression mode and a low pressure loss mode;

FIGS. 7a and 7b are transverse cross-sectional views respectively depicting the operation of the embodiment of FIG. 6 with the noise suppressing cascades exposed and with the noise suppressing cascades covered;

FIG. 13 is an isometric view of an alternative cascade configuration usable in the embodiments of the invention depicted in FIGS. 10 through 12;

DETAILED DESCRIPTION

Figure 1:
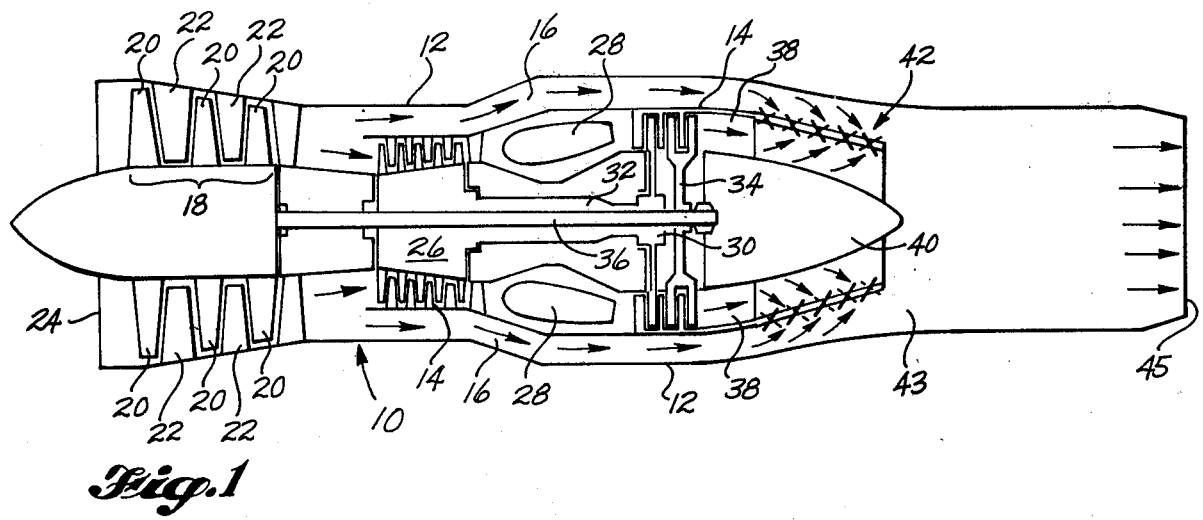
FIG. 1 is an axial, cross-sectional view diagrammatically depicting one type of bypass or turbofan engine utilizing a mixer in accordance with this invention.

FIG. 1 illustrates, in simplified fashion, a turbofan engine 10 in which the present invention can be advantageously employed. The engine 10 includes an outer shell or housing 12 and an inner shell 14 with the inner shell 14 being concentrically supported within the housing 12 so as to define an annular flow duct 16. A fan stage 18 is journalled within the housing 12 forwardly of the inner shell 14. The fan stage 18 includes a series of outwardly extending rotors or blades 20 which are interposed between a series of inwardly extending stators 22 that are attached to the outer housing 12. The fan stage 18 receives ambient air through a generally circular opening 24 defined at the forward end of the housing 12. A portion of the compressed air delivered by the fan stage 18 flows rearwardly through the annular duct 16 with the remaining portion being delivered to a high pressure axial compressor 26 that is journalled within the forward region of the inner shell 14.

The high pressure air exits the compressor 26 to a generally annular combustor assembly 28. Fuel, injected into the combustor assembly 28 by a series of nozzles (not shown in FIG. 1) is mixed with the compressed air and ignited within the combustor assembly 28. The hot combustion gasses exiting the combustor assembly 28 drive a high pressure turbine stage 30 which, in turn, drives the high pressure axial compressor 26 through a shaft 32. A low pressure turbine stage 34, which is connected to the fan stage 18 by a shaft 36 that passes coaxially through the shaft 32, is driven by the combustion products exiting the high pressure turbine stage 30. As the high temperature, high velocity combustion products or primary fluid stream exit the turbine 34, the gasses flow rearwardly through an annular duct 38 formed between the inner shell 14 and a rearwardly projecting tail cone 40. As is shown in FIG. 1, the tail cone 40 is of somewhat frustoconical or bullet-shaped geometry and projects rearwardly beyond the terminating edge of the inner shell 14. As shall be recognized upon understanding the present invention, the mixing apparatus of the present invention can be employed in gas turbine engines having other variously-shaped engine plugs, or no engine plug at all. Such engine plugs can be advantageous to increase the penetration of streams of fan air that are directed into the primary flow by the mixing apparatus of this invention to thereby increase mixing and achieve the desired mixing with minimal length mixing apparatus.

In any case, a mixer in accordance with this invention is attached to, and projects rearwardly from, the aft terminus of the inner shell 14 (e.g., a turbine flange) to form a common boundary between the concentrically flowing fan air and primary fluid stream. As is indicated in FIG. 1, the mixer 42 has a generally conical shape and concentrically surrounds the engine plug 40 to control the flow of both the primary fluid stream and the fan stream. As is further indicated in FIG. 1, and as shall be described in more detail hereinafter, unlike the prior art mixers such as the daisy mixer, the mixer 42 does not define a solid boundary region between the two flowstreams but causes specific portions of the fan air that flow contiguously to the mixer to flow inward into the primary flow and causes specific portions of the primary flowstream that flow contiguously to the mixer to flow outward into the fan flow. More explicitly, the mixer 42 is structurally divided into two types of axially extending mixer segments with the two types of segments being circumferentially interspersed about the periphery of the mixer 42. The first type of mixer segments (fan cascades) directs contiguous regions of the rearwardly flowing fan air inwardly to cause axially extending regions of flow in which fan air penetrates into the rearwardly flowing primary flow. The second type of mixer segments (primary cascades) directs adjacent regions of the rearwardly flowing primary flow outwardly to cause axially extending regions of flow in which the primary flow penetrates into the rearwardly flowing fan air. Thus, partial mixing is established along the axial boundary of the mixer 42 and an overall flow pattern is established which causes the two streams to continue to mix as the fluids pass by the aft terminus of the mixer 42. Continued mixing of the fluid flows is facilitated by a common duct region 43 formed by the outer shell 12 which projects rearwardly beyond the aft terminus of the tail plug 40 and mixer 42. The mixed fluid stream then exits a generally circular opening 45 defined by the aft terminus of the shell 12 as a single, thrust-producing fluid stream.

Figure 2:
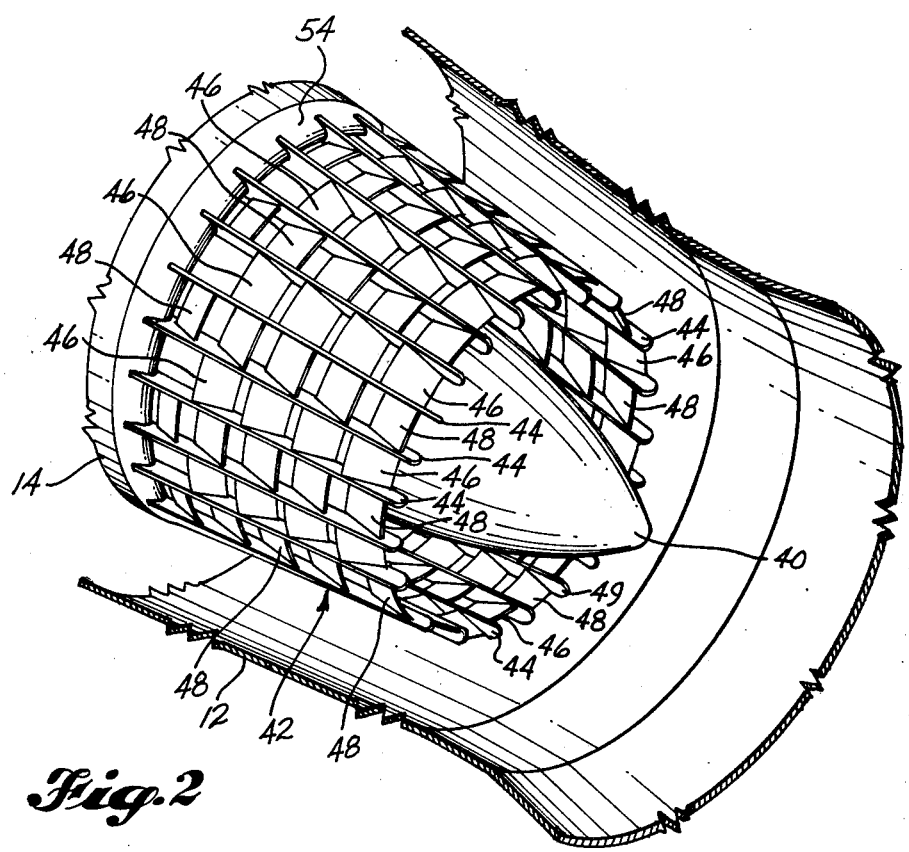
FIG. 2 is an isometric view, partially cut away for clarity, of one embodiment of the invention.
Figure 3:
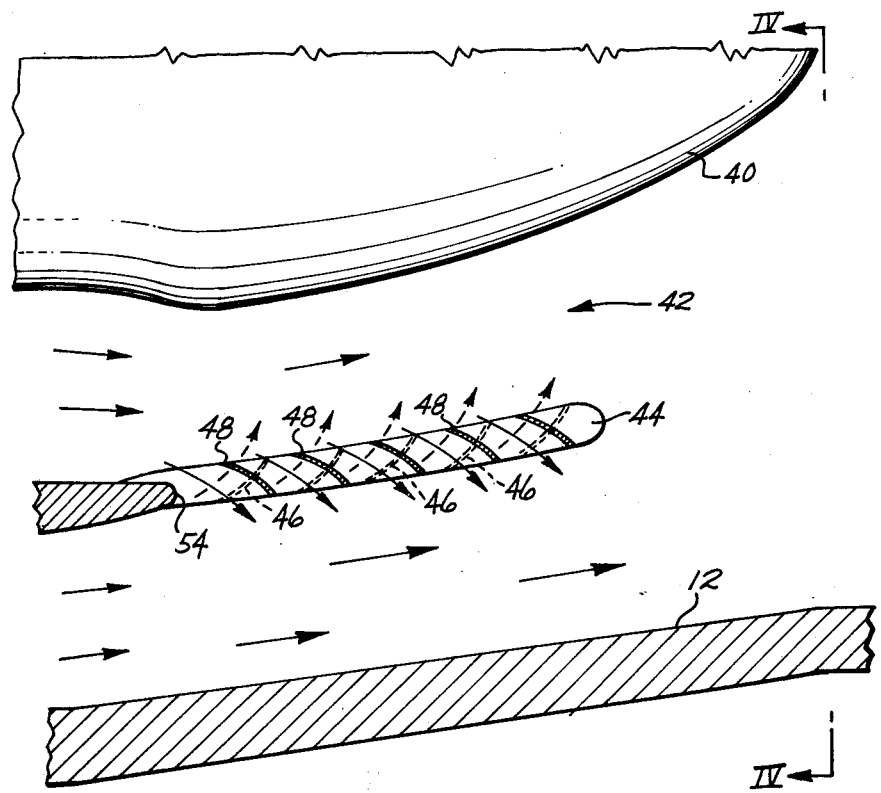
FIG. 3 is an axial, cross-sectional view of the embodiment depicted in FIG. 2.
Figure 4:
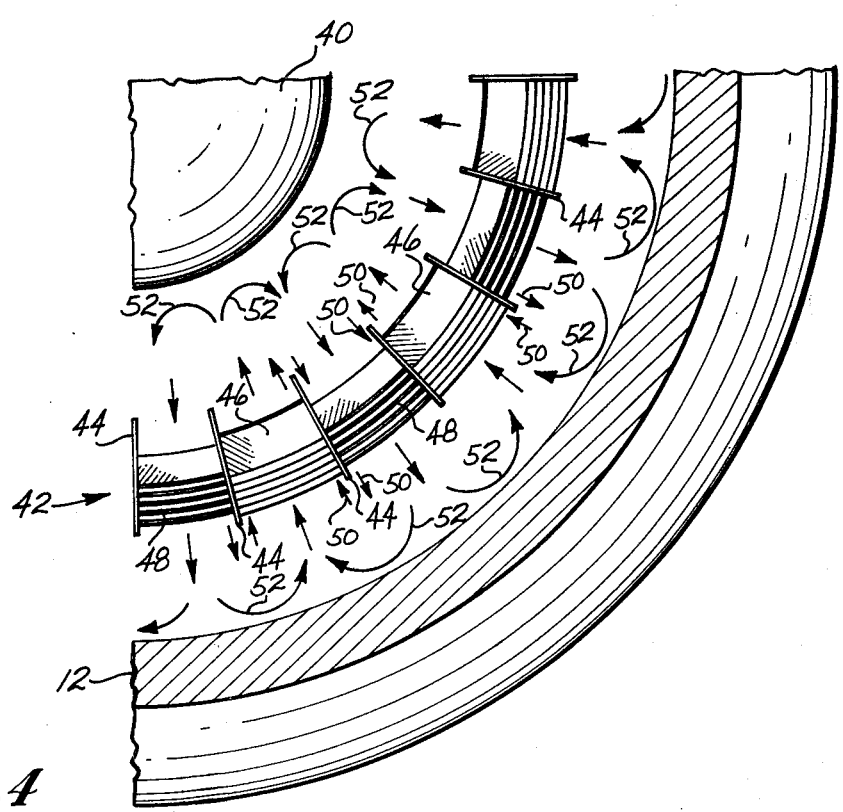
FIG. 4 is a partial transverse cross-sectional view taken along the line IV—IV of FIG. 3.

FIGS. 2, 3 and 4 depict one embodiment of the mixer of this invention. Referring particularly to FIG. 2, the mixer 42 includes a plurality of generally flat metal strips or strongbacks 44 that extend axially rearward from the annular terminus of the inner shell 14. The axial strongbacks 44 are equally spaced-apart from one another with the inner and outer edges of each strongback 44 being coincident with imaginary surfaces that define cylinders or truncated cones. In the embodiment depicted in FIGS. 2 through 4, an even number of strongbacks 44 is employed to divide the axially extending cylindrical region encompassed by the axial strongbacks into an even number of axially extending segments.

Each segment or intervening region defined between adjacent strongbacks 44 includes a cascade or series of deflection vanes which cause a portion of one of the fluid streams to flow into or penetrate the other fluid stream. More explicitly, in the embodiment of FIG. 2, a plurality of deflection vanes 46 for deflecting fan air inward into the primary fluid stream are mounted between one side surface of each strongback 44 and the juxtaposed side surface of the adjacent strongback 44. A second plurality of deflection vanes 48 for deflecting the primary flow outward into the rearwardly flowing fan air spans the intervening region between the second side surface of each axial strongback 42 and the juxtaposed side surface of the other adjacent strongback 44. Thus, the cylindrical region encompassed by the mixer 42 is subdivided into rows of axially extending cascades or series of deflection vanes 46 and 48 that respectively divert fan air inward into the primary flowstream and divert primary flow outward into the fan airstream. In particular, the cascade rows for diverting fan air radially inward (hereinafter denoted as fan cascades) are alternately interspersed between the cascade rows for diverting primary air radially outward into the fan airstream (hereinafter denoted as primary cascades).

As can be seen in FIG. 2, and as is more clearly shown in FIG. 3, the deflection vanes 46 and 48 of each cascade row extend between the inner and outer edges of the strongbacks 44 with the deflection vanes 46 and 48 being canted relative to the axially extending edges of the strongbacks 44. In particular, each deflection vane 46 is canted such that the leading edge thereof intercepts the flowing fan air, and each deflection vane 48 is canted such that the leading edge thereof intercepts the primary flowstream. Accordingly, adjacent deflection vanes 46 of each fan cascade define rectangular or slightly trapezoidal passageways for directing portions of the fan air into the primary stream, and each of the adjacent deflection vanes 48 of the primary cascades define rectangular or slightly trapezoidal passageways for directing primary flow into the rearwardly flowing fan air. As is shown in FIG. 3, each deflection vane 46 and 48 preferably has a radius of curvature which tends to increase the radial component of velocity of that fluid flowing between adjacent deflection vanes.

As depicted in FIGS. 3 and 4, with the above described mixer arrangement, a flow pattern is established along the axial length of the mixer 42 wherein circumferentially interspersed, axially extending portions of the two fluid streams are caused to penetrate into the other fluid stream to partially mix portions of the fluid streams flowing along the axial boundary of the mixer 42. As is most clearly shown in FIG. 4, when viewed transverse to the axial centerline of the engine, this flow pattern includes shear flow (denoted by the arrows 50) at free-stream boundaries between the mixing fluid streams and also includes regions of vortical fluid flow (denoted by the arrows 52) that are caused by flow displacement which results from the forced penetration of one fluid stream by the other. Since both of these flow characteristics cause the two fluid streams to mix with one another, with additional mixing being effected by axial shear flow arising at the free stream boundaries of the two fluids due to differences in the axial velocity component of the fan air and primary fluid stream, a considerable amount of mixing occurs over the axial length of the mixer 42. Further, such mixing continues as the fluid flow passes by the aft terminus of the mixer 42 and into the common duct 43 of FIG. 1. It will be recognized that, as the fluid streams flow rearwardly through the common duct 43, the mixing process continues until viscous damping effects, inherent in such a mixing process, cause the radial shear flow regions and the vortical fluid flow regions to subside.

Referring again to FIGS. 2 and 3, it should be noted that prior to encountering the deflections vanes 46 and 48 that form the fan cascades and primary cascades, the two fluid streams pass over an annular free mixer 54 formed at the aft terminus of the inner shell 14. More explicitly, as is shown in FIG. 3, the aft terminus of the inner shell 14 forms an annular ring having a smoothly contoured trailing edge (e.g., rounded or radiused) to which the strongbacks 44 are mounted. As the primary fluid stream and the fan airstream pass by the annular free mixer 54, portions of the two fluid streams merge with one another so that a certain degree of free mixing occurs before the fluid streams encounter the forwardmost deflection vane 46 or 48. Advantageously, it has been found that configuring the mixer 42 such that the static pressures occurring at the fore and aft terminations of the mixer 42 substantially match the static pressures that would occur in the absence of the mixing apparatus, allows the annular free mixer 54 to establish the engine cycle match. Thus, the configuration of the fan cascades and primary cascades of the mixer 42 have minimal effect on an established engine cycle.

Since the discharge coefficients of an annular free mixer such as the free mixer 54 are known within the art, the free mixer 54 can be easily configured to match a desired engine cycle. This property of the mixer 42 is especially important in embodiments of the invention configured for use with existing engine designs since the engine manufacturer generally establishes the engine cycle, and failure to match a mixer to an established engine cycle can result in substantial loss of performance and engine surge margin. As previously described, since the exit plane geometry of prior art mixers such as a daisy mixer establish engine cycle match and the discharge coefficients of such a mixer configuration cannot be derived by theoretical means, a great deal of experimental effort has generally been expended to arrive at the prior art mixer arrangements suitable for use in a particular gas turbine engine. Further, the mixer 42 of this invention with the integrally formed, forwardly positioned free mixer 54 often exhibits off-design engine performance superior to that obtained when prior art mixers are utilized since the primary flow and fan airstream adjust readily to the rounded trailing edge of the annular free mixer 54 and the resulting flow pattern causes only a slight increase in mixer losses due to the change in angle at which the flowstreams intercept the deflection vanes 46 and 48.

In view of the above-described embodiment of FIGS. 2 through 4, it can be realized that several parameters control the degree of mixing effected by the mixer 42. First, the amount of mixing is directly related to the axial length of the mixer 42. Generally, this length parameter is established in view of the space available for the mixer 42 and axial common duct region 43 and, in view of the mixer weight-performance tradeoffs. As compared to prior art mixers of the daisy type which provide comparable mixing characteristics, it has been found that weight savings on the order of 30% can often be obtained with the embodiment of this invention depicted in FIGS. 2 through 4. Accordingly it can be recognized that the practice of this invention can provide more thorough mixing and hence greater jet noise suppression while simultaneously not unduly increasing the overall weight of the engine installation.

Secondly, although the cant angle of the deflection vanes 46 and 48 is generally established such that flow separation does not occur as the flowstreams are redirected by the deflection vanes, the chord length of each deflection vane at least partially controls the depth of penetration of the redirected fluid stream into the other fluid stream to, in turn, at least partially control the amount of mixing effected by a particular embodiment. In this respect, both the number of deflection vanes and the chord angles thereof are generally established in view of the desired degree of mixing and the pressure losses incurred as the fluid streams flow along the deflection vanes 46 and 48. As shall be described relative to the embodiments of FIGS. 9–12, embodiments of the invention having fewer deflection vanes generally utilize vanes of greater chord length to insure adequate pentration of the redirected fluid streams.

Thirdly the width of the primary and fan cascade rows or segments and hence the number of cascades employed in a particular embodiment of the invention partially controls the degree of mixing. In this respect, increasing the number of cascade rows or segments generally produces more thorough mixing in the regions of penetration. However, the penetration depth is not as great in such an embodiment of the invention since the total amount of radial shear flow (arrows 50 of FIG. 4) is increased. With respect to current turbofan engine designs, it is believed that on the order of 8 to 32 primary and/or fan cascades provide the most advantageous mixing. In this respect, in engines having a circular exhaust duct, especially those having no tail plug, a fewer number of cascades e.g., 8, should provide the most advantageous mixing. On the other hand, in engines having a relatively large area exhaust duct and a large, bulbous tail plug, on the order of 20 or more primary and/or fan cascades should provide the most advantageous mixing.

As previously described, although a theoretical increase in thrust results from mixing the fan stream within the primary flow prior to discharging the fluid stream from a turbofan engine, this thrust advantage is often not achieved because of pressure losses arising within the mixing apparatus. Although embodiments of this invention exhibit pressure losses comparable to those encountered in prior art mixers that provide an equal amount of mixing, pressure losses sufficient to cause a slight loss of thrust performance relative to a comparable turbofan engine exhausting unmixed flow may be encountered in embodiments of the invention configured for extremely high level suppression of jet noise. In these embodiments of the invention it can be advantageous to cover or retract the cascades during certain flight regimes. Specifically, since noise abatement is generally necessary only during takeoff, landing, and low level flight over populated regions, such an embodiment permits the cascades to cause flow mixing during such flight modes and eliminates the mixing and attendant pressure losses during flight regimes such as high altitude cruise wherein noise suppression is not required.

Figure 5A:
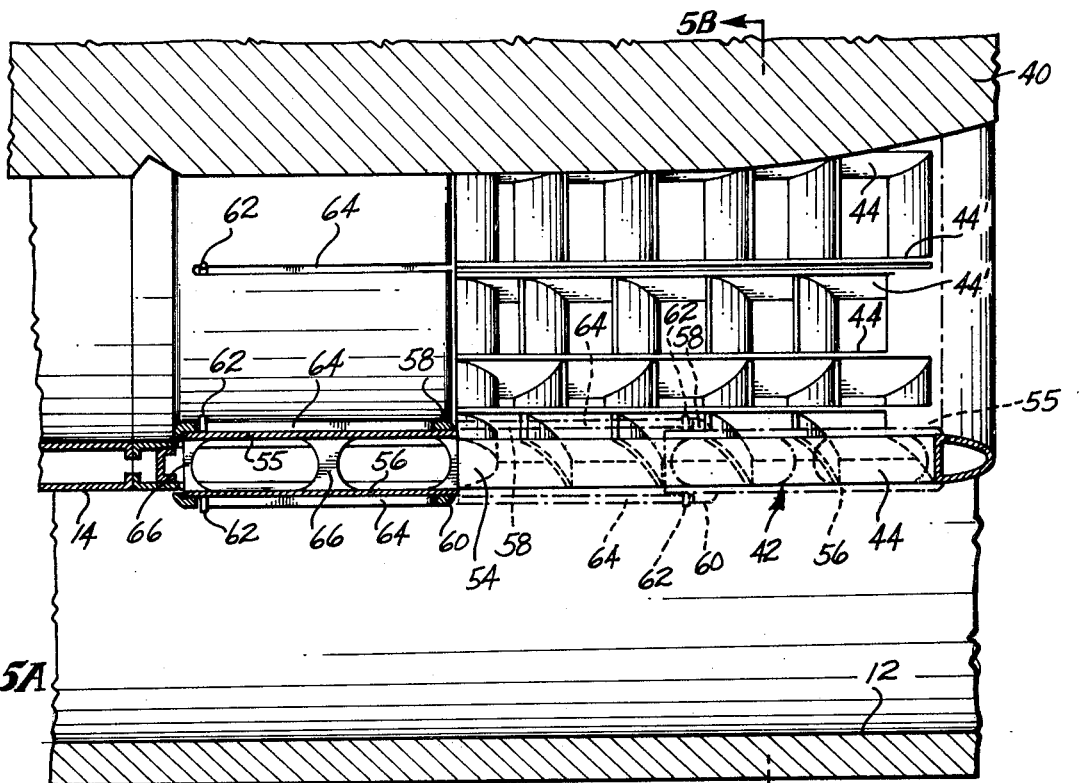
FIGS. 5a and 5b are respectively an axial cross-sectional view and a transverse cross-sectional view of an embodiment of the invention having telescoping covers to permit operation of the invention in a noise suppression mode and in a low pressure loss mode (e.g., aircraft cruise operation) wherein noise suppression is not effected.
Figure 5B:
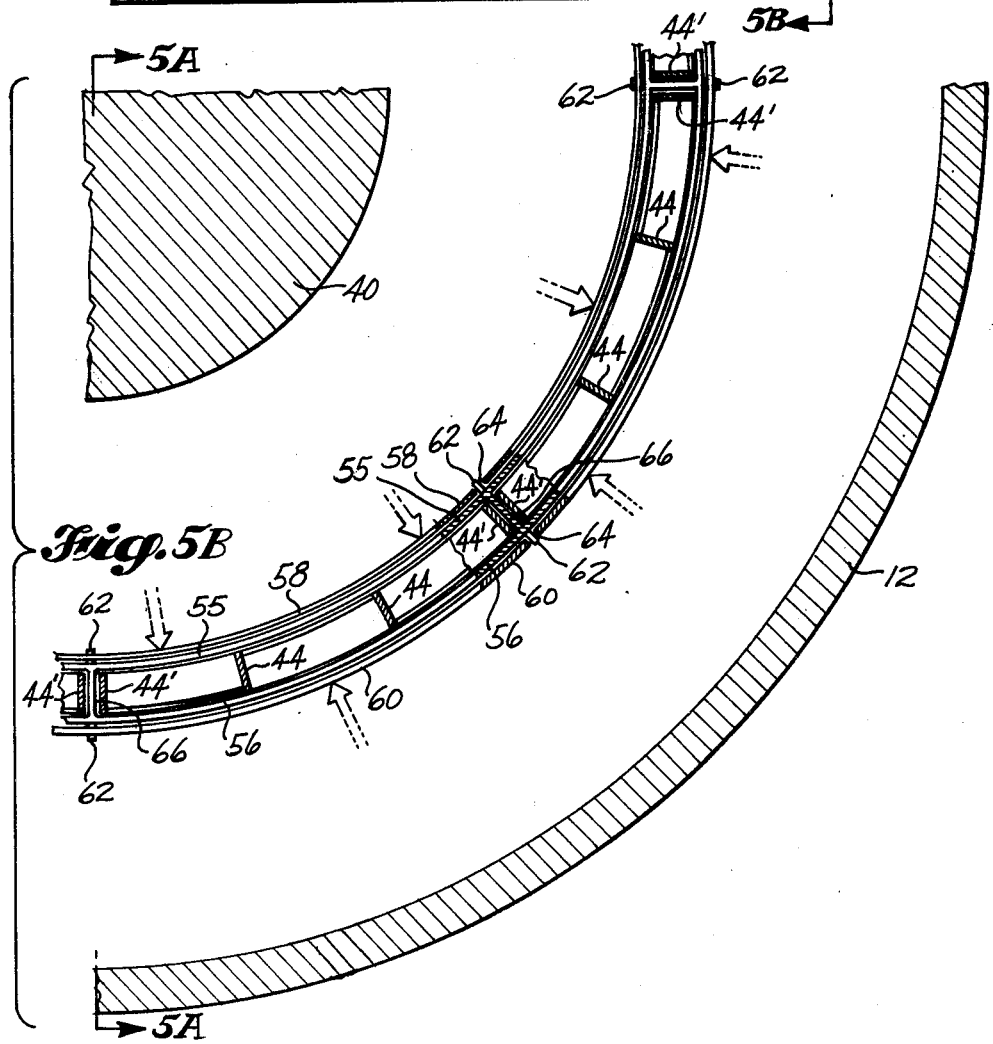

One such embodiment, configured for use in a turbofan engine having a substantial circular exhaust duct geometry, is depicted in FIGS. 5a and 5b. In this embodiment, a mixer 42 such as the mixer depicted in FIGS. 2 through 4 is equipped with a set of telescoping cylindrical covers that can be stowed forward of the aft terminus of the annular free mixer 54 in order to expose the cascades or can be slid rearward to cover the cascades whenever required. As can be seen in FIG. 5a, the depicted embodiment includes four cylindrical sections 55, 56, 58 and 60 with the outer diameter of the cylindrical section 55 and the inner diameter of the cylindrical section 56 being respectively sized to correspond to the inner and outer diameters of the annular free mixer 54 (and hence the inner and outer diameter of the mixer 42). The outer diameter of the cylindrical section 58 and the inner diameter of the cylindrical section 60 are respectively sized to correspond to the inner diameter of the cylindrical section 55 and the outer diameter of the cylindrical section 56. Thus, as shown by the solid lines of FIG. 5a, when each cylindrical section is telescoped forwardly to be positioned over the annular free mixer 54, the cylindrical sections 55, 56, 58 and 60 nest with one another to expose the previously described fan cascades and primary cascades to the fluid streams passing over the aft terminus of the free mixer 54.

As is shown by the phantom lines of FIG. 5a, the axial dimensions of the cylindrical sections 55, 56, 58 and 60 are established such that when the cylindrical sections are slid rearward, the terminating edge of the sections 55 and 56 extends to a position coincident with or aft of the leading edge of the rearmost deflection vanes 46 and 48. In this extended position, the rearwardmost portions of the cylindrical sections 58 and 60 respectively overlap a forward portion of the cylindrical sections 55 and 56, with the forward terminus of the sections 58 and 60 covering the rounded trailing edge of the annular free mixer 54.

To provide for extension and retracion of the cylindrical cylinders 55, 56, 58 and 60 by a single actuator mechanism, the cylindrical sections 55 and 56 include a plurality of radially projecting pins 62 that are located near the forward boundary of the cylindrical sections and are circumferentially spaced-apart around the boundaries of the cylindrical sections 55 and 56. In particular, each pin 62 of the cylindrical section 55 projects inwardly through an axial slot 64 in the cylindrical section 58 and each pin 62 of the cylindrical section 56 projects outwardly through a similar slot 64 in the cylindrical section 60. With this arrangement, a single actuator mechanism (not shown in FIGS. 5a and 5b) controls the fore and aft displacement of the cylindrical sections 55 and 56. When the cylindrical sections are being deployed rearwardly to cover the mixer 42, the cylindrical sections 55 and 56 move rearwardly in unison with one another until the pins 62 contact the aft terminations of the slots 64. As the actuator continues to slide the cylindrical sections 55 and 56 rearward, the cylindrical sections 58 and 60 are carried along to cover the forward region of the mixer 42. When the cylindrical sections are retracted, the cylindrical sections 55 and 56 are moved forward until the pins 62 engage the forward terminations of the slots 64 to move all four cylindrical sections into the retracted position shown by the solid lines of FIG. 5a.

As shown in FIGS. 5a and 5b, to structurally interconnect the cylindrical sections 55 and 56 and to cause the sections 55 and 56 to move in unison with one another during the above-described retraction and extension, the cylindrical extensions 55 and 56 are joined together by a plurality of webs 66 that are circumferentially spaced-apart along the perimeter of the sections 55 and 56 and extend radially therebetween. To accommodate the radially extending webs 66, axially extending tracks or slots are formed in the mixer 42, including the portion of the mixer that forms the annular free mixer 54. Each slot is formed by two parallel, spaced-apart, axial strongbacks 44′. More explictly, in the embodiment of FIG. 5, the adjacent fan cascade and primary cascade along the axial path traversed by each web 66 includes a separate axial strongback 44′ rather than being separated from one another by a single axial strongback 44 as are the adjoining cascades of the embodiment depicted in FIGS. 2 through 4 and adjoining cascades of the embodiment of FIG. 5 that are not traversed by an axial web 66.

If desired or necessary, cylindrical sections 58 and 60 can be structurally interconnected by webs similar to webs 66 that extend radially between the inner surfaces of the cylindrical sections 58 and 60. When such webs are employed, axially extending slots are formed in the cylindrical sections 55 and 56 to allow the webs to pass therethrough and permit the previously-described extension and retraction of the cylindrical sections 55, 56, 58 and 60.

A second embodiment of the invention that includes axially extending fan cascades and primary cascades which can be covered for maximum thrust performance and uncovered for maximum jet noise suppression is depicted in FIGS. 6a, 6b, 6c, 7a and 7b. In this embodiment, which is suitable for use in situations wherein the cross-sectional outline defined by the mixer 42 is not of a constant diameter relative to the axial direction of fluid flow, adjacent fan cascades and primary cascades of equal width are separated by a closed axial member 70 having a width equal to that of the cascade rows. As indicated in FIG. 6b these closed axial members 70 can be formed by joining appropriate intervening regions between adjacent axial strongbacks 44 with spacer plates 72 and 74, which respectively have a radius of curvature corresponding to the inner and outer conical outlines defined by the mixer 42.

In such an embodiment of the invention, it can be recognized that, when viewed in transverse cross-section (e.g., FIGS. 6b and 7a), the mixer 42 includes an alternating arrangement of a fan cascade, a closed axial member 70, a primary cascade and a closed axial member 70. Hence, in such an embodiment that employs n fan cascades and n primary cascades, 2n closed members 70 are required and the mixer 42 is effectively partitioned into 4n axial segments each subtended by an angle of $\pi/2n$ radians.

As is most clearly depicted in FIG. 6a, the mixer 42 is enclosed within an annular shroud 76. The annular shroud 76 is generally U-shaped in geometry with the closed end thereof projecting rearwardly from the aft terminus of the mixer 42 to form an annular terminating edge 80. The inner and outer surfaces formed by the substantially parallel boundaries of the annular shroud 76 each include a series of substantially rectangular, axially extending slots 78. Each slot 78 is of a width substantially equal to the width of the fan cascades and primary cascades, with adjacent slots 78 being separated by an equivalent distance. As shown in more detail in FIG. 6c, an inwardly extending annular ring 82 is formed near the forward termination of each substantially parallel surface of the shroud 76 with each ring 82 being engaged with an annular groove 84 formed in the inner and outer surface of the free mixer 54.

In view of this arrangement, and as is depicted in FIGS. 6a and 7a, the annular shroud can be rotatably positioned to expose the fan cascades and primary cascades. As is depicted in FIG. 7a, when the shroud 76 is rotated to expose the cascades of the mixer 42, contiguous portions of the fan air flow inwardly through the fan cascades and contiguous portions of the primary flowstream pass outwardly through the primary cascades. Since in this embodiment of the invention, adjacent primary and fan cascades are separated by the intervening closed axial members 70, less radial shear flow is effected than that produced by previously-described embodiments of the invention having a substantially identical arrangement of deflection vanes 46 and 48 within the primary and fan cascades. Although such radial shear flow is one of the mechanisms which cause fluid mixing within the invention, the decrease in radial shear flow exhibited by an embodiment of the invention such as that depicted in FIGS. 6 and 7 does not necessarily result in less overall fluid mixing. More explicitly, with less shear flow, greater penetration often occurs, thereby causing greater displacement flow and more substantial vortical flow.

To close off the cascades during high altitude cruise or other flight modes during which noise suppression is not required, the shroud 76 is rotated through an angle of $\pi/2n$ radians, where n is the number of fan cascades and primary cascades included within a particular embodiment. A variety of conventional actuation mechanisms can be employed to rotate the shroud 76. For example, in FIGS. 6a and 6c, one or more pneumatic or hydraulic linear actuators 86, located in the interior region of the inner shell 14 is connected to the outer surface of the shroud 76 by a small slider arm 90. Each slider arm 90 is somewhat L-shaped in geometry with the termination of the shorter leg thereof being connected to the plunger or piston of the linear actuator 86 and passing radially outward through a slot 88. Each slot 88 has a length of at least $\pi/2n$ radians and is formed in the outer surface of the inner shell 14. The longer leg of the L-shaped slider arm 90 projects rearwardly with the aftmost portion thereof being connected to the outer surface of the shroud 76. By activating the linear actuators 86, the shroud 76 can be rotated to expose the cascades as shown in FIG. 7a or rotated to cover the cascades as shown in FIG. 7b. When the shroud 76 is rotated to cover the cascades the depicted embodiment functions as an axial extension of the exhaust duct and free mixing of the primary fluid stream and fan air occurs as the fluid streams pass across the terminus 80 of the shroud 76 into the common exhaust duct or mixing chamber 43 of FIG. 1.

It has been found that a variation of the invention wherein only one of the fluid streams is mechanically deflected by cascade rows to penetrate the other fluid stream often provides satisfactory noise suppression while simultaneously resulting in a lighter weight mixer that exhibits less pressure losses than the previously described embodiments. As shall be described hereinafter, in each embodiment of the invention wherein a first one of the two fluid streams is deflected into the other fluid stream by suitable fan or primary cascades, the other fluid stream is induced to flow into or penetrate the first fluid stream by flow displacement and vorticity effects which are caused by the penetrating fluid. That is, in such an embodiment wherein fan cascades cause streams of the rearwardly flowing fan air to flow radially inward and penetrate the primary flowstream, portions of the rearwardly flowing primary stream are caused to flow radially outward into the flowing fan air by fluid displacement and vortical flow effected by the penetrating streams of fan air. Similarly, in embodiments wherein primary cascades cause the radial outward deflection of portions of the primary stream into the rearwardly flowing fan stream, flow displacement and vortical flow cause portions of the fan air to flow radially inward into the primary flowstream.

Figure 8A:
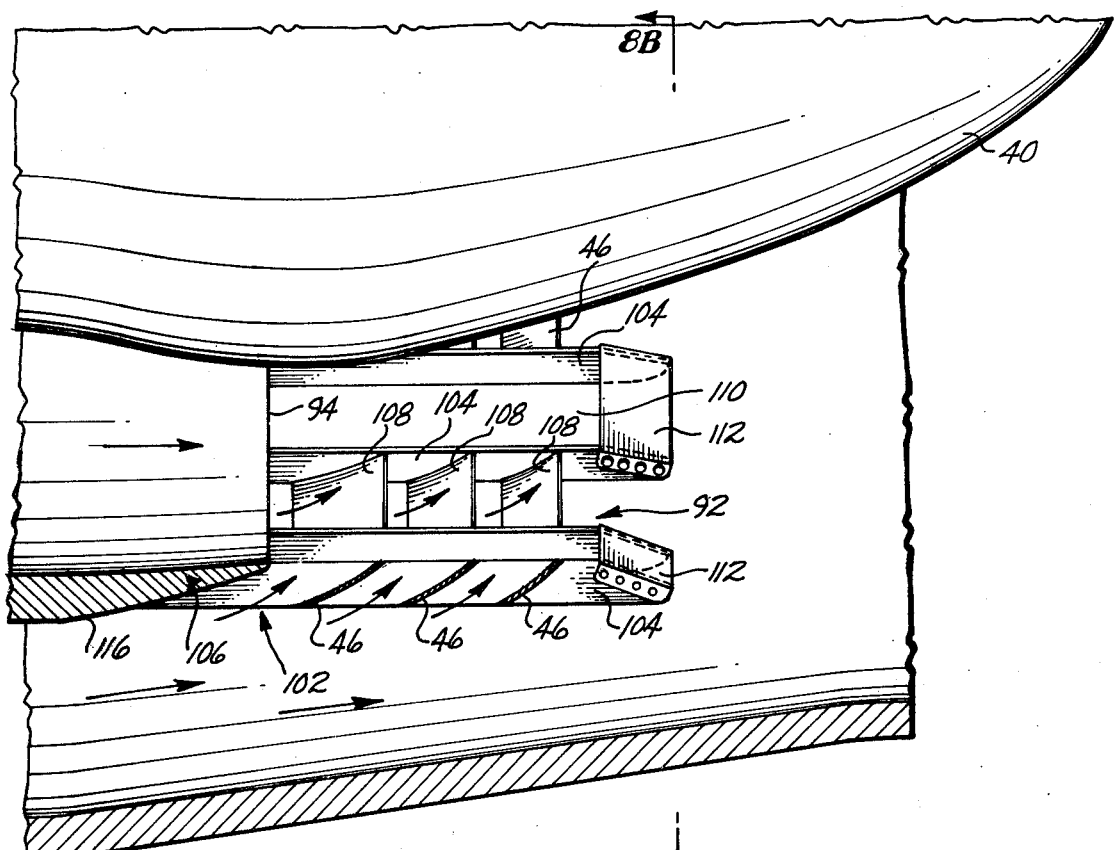
FIGS. 8a and 8b are respectively an axial cross-sectional view and a transverse cross-sectional view of one embodiment of the invention employing spaced-apart axially extending fan cascades.
Figure 8B:
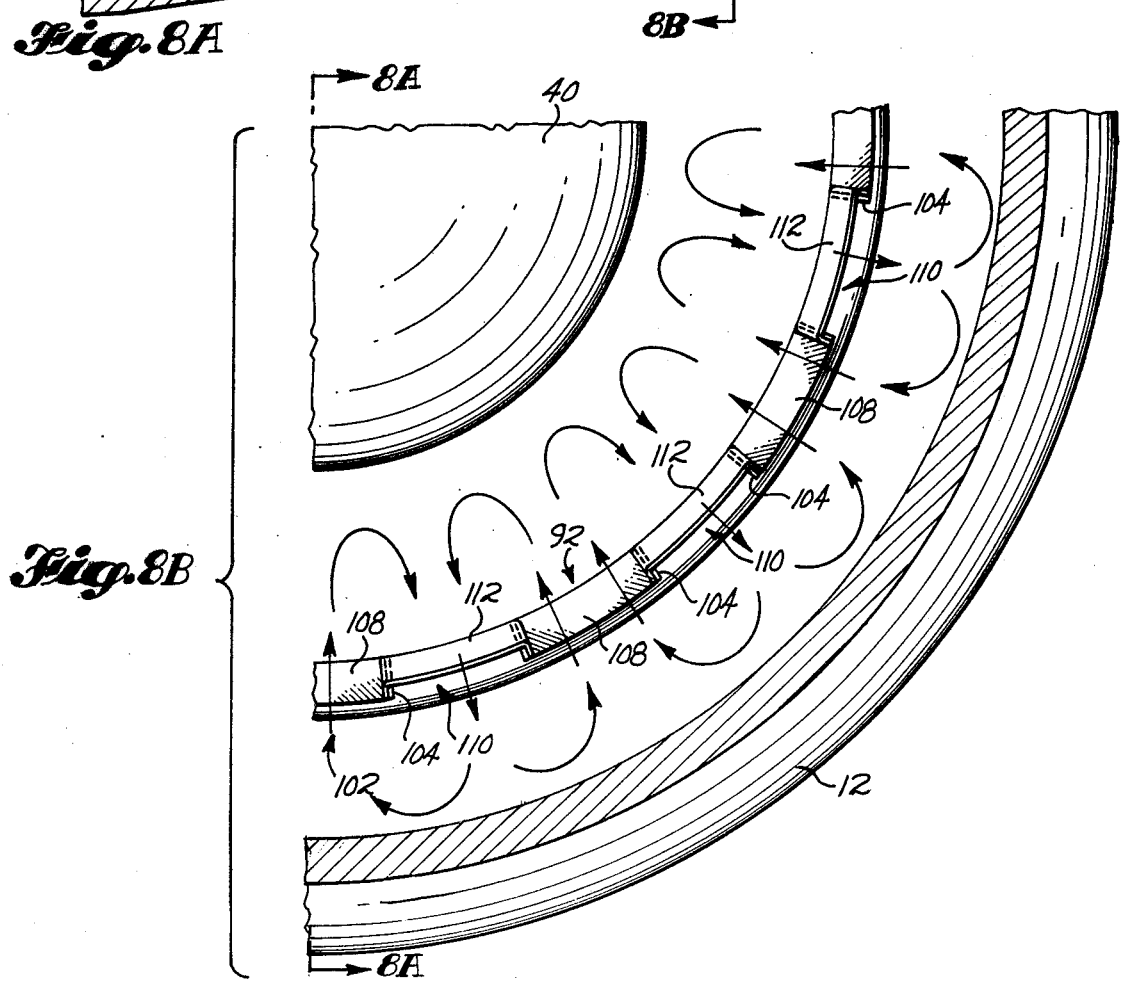

One embodiment of the invention (generally denoted by the numeral 102) which includes fan cascades for directing fan flow radially inward, but does not include primary cascades, is depicted in FIGS. 8a and 8b. One advantage of an embodiment such as that of FIG. 8 is that, since the fan air is substantially cooler than the primary fluid stream, lighter weight alloys can often be utilized for construction of the mixer. For example, in embodiments of the invention wherein primary cascades direct primary flow into the fan stream, steel alloys are often desirable, whereas in embodiments of the invention including only fan cascades, the use of titanium alloys is generally feasible.

Comparing the embodiment of the invention depicted in FIGS. 8a and 8b with the previously described embodiment depicted in FIGS. 2 through 4, it can be noted that the two embodiments are similar in that the mixer 102 of FIG. 8 and the mixer 42 of FIGS. 2 through 4 each include a plurality of axially extending fan cascades 92 which direct fan flow inwardly toward the axial centerline of the engine exhaust duct. As in the embodiment of FIGS. 2 through 4, the fan cascades 92 of the embodiment of FIG. 8 are formed by substantially rectangular strongbacks 104 that project axially rearward from spaced-apart positions along the annual aft terminus 94 of an annular free mixer 106. Alternate intervening regions defined between the rearwardly extending strongbacks 104 include a plurality of spaced-apart deflection vanes 108 configured and arranged as described relative to the deflection vanes 46 of the embodiment of the invention depicted in FIGS. 2 through 4. Thus, as viewed from the rear (FIG. 8b) the mixer 102 includes a series of fan cascades 92 circumferentially spaced-apart by open regions 110 having a width or angle of inclusion substantially equal to that of each fan cascade 92.

To structionally interconnect the strongbacks 104 with one another, end plates 112 having orthogonally projecting flanges along two oppositely disposed edges thereof are mounted across the open regions 110 at the aft terminus of the strongbacks 104. Preferably, as shown in FIG. 8a, the aft region of each strongback 104 is chamfered or tapered such that the rectangular surface of each end plate 112 is angularly disposed relative to the axially extending edges of the strongbacks 104. This angular orientation is advantageous in that it aligns the end plate 112 with the primary fluid stream flowing through the open region 110.

Viewing the embodiment depicted in FIG. 8 as compared to the embodiment of FIGS. 2 through 4, it can also be noted that the structure of the annular free mixer 106 differs somewhat from the structure of the annular free mixer 54 of the previously described embodiment. Specifically, the inner diameter of the free mixer 106 is relatively constant with respect to the axial direction, with the outer wall 116 of the annular free mixer 106 converging inwardly to form the smoothly rounded annular termination 94 which is substantially coincident with the inner edge of the axially extending strongbacks 104. As can be seen in FIG. 8a, this arrangement allows fan air to flow freely into the region between the forwardmost deflection vane 108 and the annular termination 94 of the free mixer 106 to allow a certain amount of free mixing between the fan air and primary fluid stream as the two fluid streams pass by the annular terminus 94. As depicted by the arrows in FIGS. 8a and 8b, the inwardly directed streams of fan air cause flow displacement within the duct region effectively formed between the inner surface of the mixer 102 and the tail plug 40 to induce an outward flow of portions of the primary stream through the open regions 110.

Figure 9A:
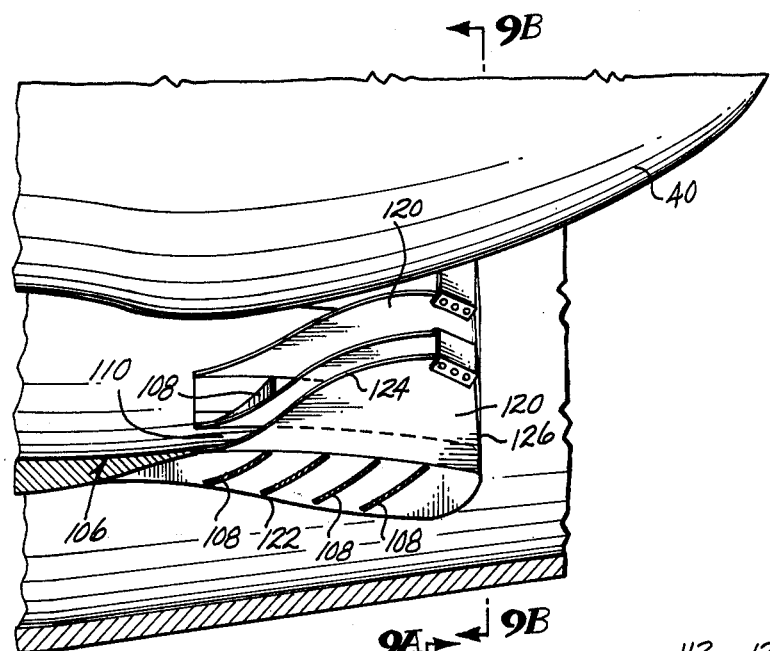
FIGS. 9a and 9b are respectively an axial cross-sectional view and a transverse cross-sectional view of a second embodiment of the invention employing spaced-apart axially extending fan cascades wherein partial flow inversion and partial flow mixing are effected.

In some embodiments of the invention, it is advantageous to configure the fan cascades 92 such that the deflection vanes thereof are positioned to intercept a greater amount of the axially flowing fan air. For example, in the mixer arrangement depicted in FIGS. 9a and 9b, the axial strongbacks 120 are generally flat metal panels that are circumferentially spaced-apart around the circumference of the annular free mixer 106. Each axial strongback 120 is contoured to radially project into both the axially flowing primary flowstream and the axially flowing fan airstream. More explicitly, as shown in FIG. 9a, with respect to the axial direction of fluid flow, the outer edge 122 of each axial strongback 120 extends progressively deeper into the flowing fan air (relative to the direction of fluid flow). Additionally, the inner edge 124 of each axial strongback 120 extends progressively deeper into the axially flowing primary fluid stream for the major portion of the axial length of the strongback 120 and is then smoothly radiused outwardly along the remaining axial length of the strongback 120. The trailing edge 126 of each axial strongback 120 is generally perpendicular to the axial centerline of the engine exhaust duct and an end plate 112 is mounted between the aft portions of the inner edges 124 of adjacent strongbacks 120 as described relative to the embodiment of FIGS. 8a and 8b.

Figure 9B:
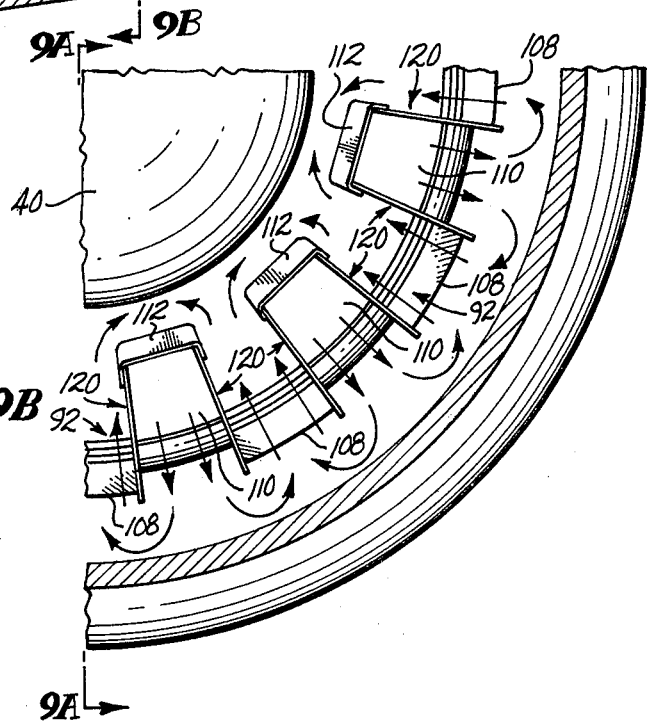

The deflection vanes 108 of the arrangement of FIGS. 9a and 9b are spaced apart along the outer edge 122 of each strongback 120 to interconnect alternate pairs of the circumferentially spaced-apart axial strongbacks 120. As in the case of each of the embodiments disclosed herein, the deflection vanes 108 can be substantially parallel to one another or can be canted at slightly different angles. Since the inner edges 122 of the axial strongbacks 120 extend progressively deeper into the flowing fan air, the leading edges of successive deflection vanes 108 are positioned outwardly of one another. Thus, the fan cascades of the embodiment depicted in FIG. 9 intercept a greater amount of fan air than the previously described embodiments and direct the streams of intercepted fan air in a radially inward and axially aft direction. The inwardly extending surfaces of the axial strongbacks 120 prevent the redirected streams of fan air from interfacing with streams of primary air that are induced to flow outwardly through the open regions 110. As described relative to the embodiment of FIG. 8, the outward flow of the primary flowstream through the open regions 110 is induced by flow displacement caused by the inwardly directed streams of fan air.

Preventing adjacent outwardly directed streams of primary flow and inwardly directed streams of fan air from interfacing with one another along the surface boundaries of the strongbacks 120 eliminates radial shear flow formed along such interfacing boundaries and permits the fan air to penetrate more deeply into the rearwardly flowing primary stream. As described relative to the previously disclosed embodiments of the invention, the penetration of the primary fluid stream by the redirected portions of the fan air causes vortical flow and axial shear flow. Because of the radial penetration of the primary fluid stream by the axial strongbacks 120 of the embodiment of FIGS. 9a and 9b, less radial shear flow is effected in this embodiment than is experienced in the previously discussed embodiments. This suppression of radial shear flow is offset by the greater penetration and stronger vortical flow that is caused by the embodiment of FIG. 9 and this embodiment provides overall mixing comparable to the embodiments of FIGS. 2-8.

In certain situations, the embodiment depicted in FIGS. 9a and 9b can be configured to take advantage of yet another sound suppressing principle. More explicitly, if the relative velocities between the fan air and primary flow permit, the mixer 102 of FIGS. 9a and 9b can be arranged to exhaust the fluid stream as a partially inverted, partially mixed stream of primary flow and fan air. As is known in the art, flow inversion refers to inverting the flow pattern wherein the fan air coaxially surrounds the primary flowstream to a pattern in which the primary flowstream coaxially surrounds the fan air. As is further known in the art, such inverted flowstreams shift the noise spectrum generated by the engine toward higher frequencies that are not only attenuated more rapidly in the atmosphere, but are also more amenable to attenuation by conventional absorbing materials such as accoustic linings that may be mounted around the walls of the common exhaust duct or other structure aft of the mixer 102. In the embodiment of FIGS. 9a and 9b, this flow inversion is effected by the relatively large, radially extending surfaces of the strongbacks 120 which prevent recirculation mixing between adjacent regions of outwardly flowing primary fluid and inwardly flowing fan air.

Figure 11:
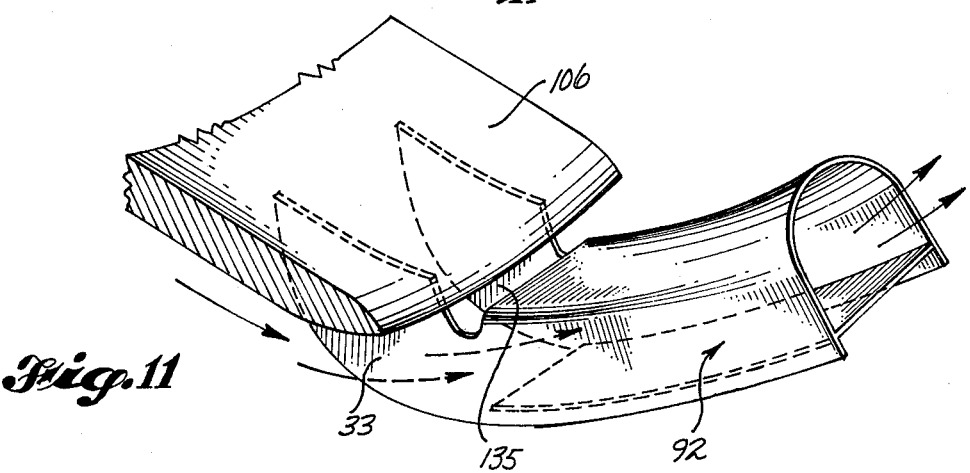
FIG. 11 is an isometric view of an alternative fan cascade which can be used in the embodiments of the invention depicted in FIG. 10.
Figure 10A:
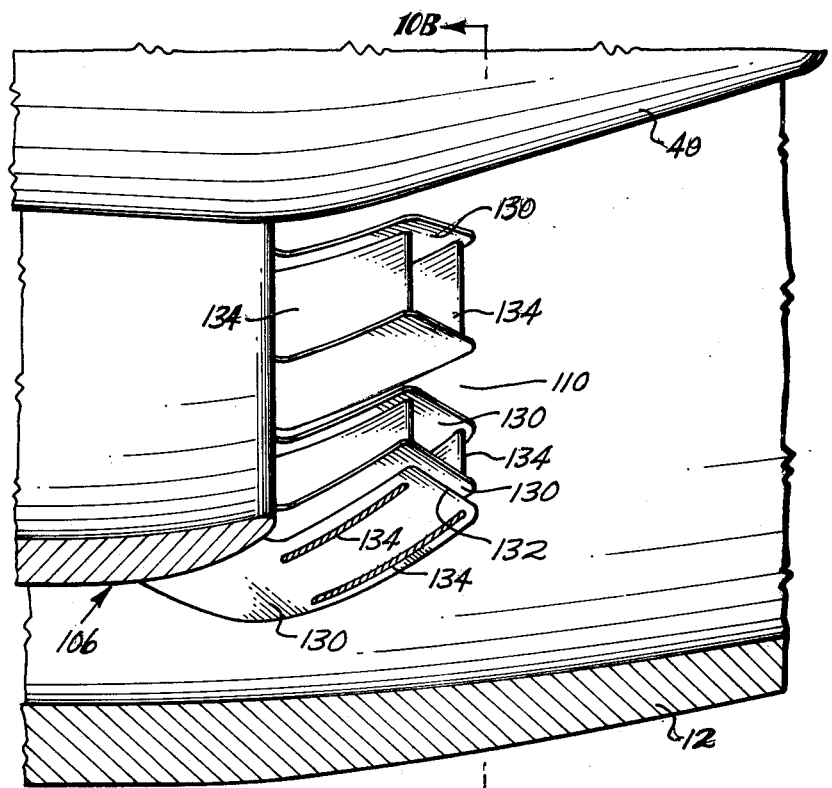
FIGS. 10a and 10b are respectively an axial cross-sectional view and a transverse cross-sectional view of another embodiment of the invention utilizing spaced-apart axially extending fan cascades.
Figure 10B:
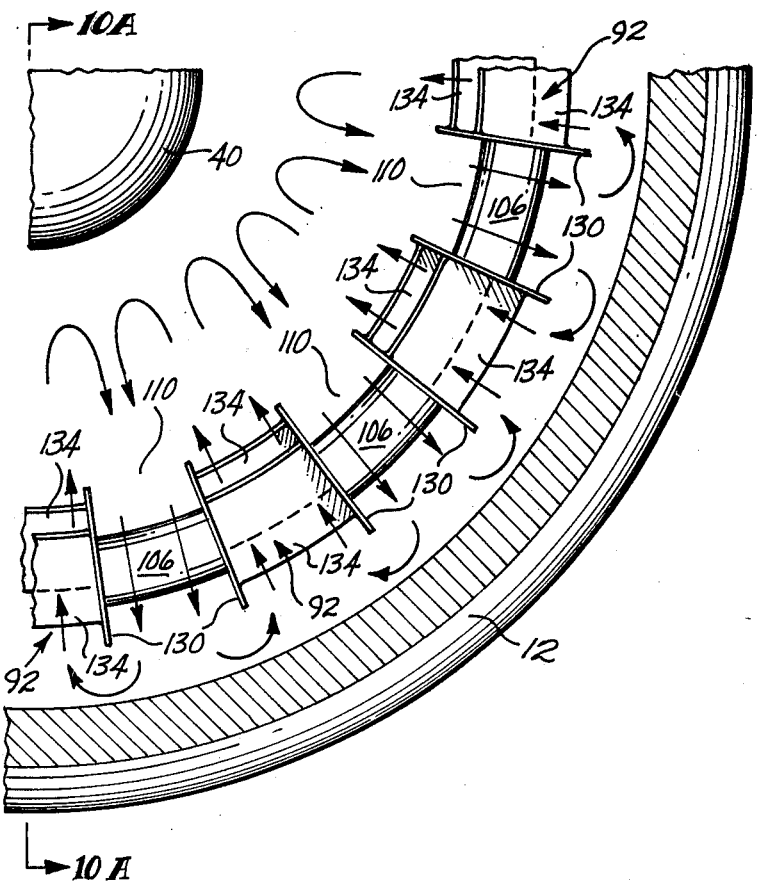

The mixer arrangement depicted in FIGS. 10a and 10b and 11, illustrates a further variation that can be practiced in embodiments of the invention employing circumferentially spaced-apart fan cascades 92 which direct fan air into the primary fluid flow and thereby induce primary flow outwardly through the open regions 110 between adjacent fan cascades. In the depicted arrangement, axial strongbacks 130, which are generally flat plates circumferentially spaced-apart around the periphery of the free mixer 106, project rearwardly such that the forwardmost portion of each strongback 130 is located within the fan stream and the aftmost portion of each axial strongback 130 is located within the primary flowstream, i.e., the aft termination 132 of each axial strongback 130 is located inwardly of the inner surface of the free mixer 106. Two deflection vanes 134 are mounted in spaced-apart, substantially parallel relationship with one another between alternate pairs of the strongbacks 130.

As can be seen in FIG. 10a, the deflection vanes 134 are of the somewhat longer chord length than the deflection vanes of the previously described embodiments. Because of this longer chord length, each fan cascade 92 generally resembles a curved duct of substantially rectangular cross-section which intercepts radially spaced-apart regions of the axially flowing fan air to inject streams of fan air into the rearwardly flowing primary fluid stream. As disclosed relative to the embodiments of the invention depicted in FIGS. 8 and 9, these inwardly flowing streams of fan air induce the outwardly flow of portions of the primary fluid stream through the intervening open regions 110 located between adjacent fan cascades.

In viewing the embodiment depicted in FIG. 10, it can be seen that the fan cascades 92 can be readily fabricated by welding the deflection vanes 134 to the axial strongbacks 130. Alternatively, as shown in FIG. 11, each fan cascade 92 can be cast as a unitary member. When the cascades are cast, it is often advantageous to smoothly contour that region of the cascade which projects into the flowing fluid stream. For example in FIG. 11, the fan cascade 92 is a curved, D-shaped channel having flanges 133 that project forwardly from the spaced-apart minor boundaries thereof for connection with the annular free mixer 106. Primary flow, passing rearwardly over the aft terminus of the freemixer 106, partially mixes with fan air passing through a substantially rectangular opening 135, formed between the cascade 92 and the aft terminus of the freemixer 106. This partially mixed fluid flow and portions of the primary fluid stream not flowing contiguous with the inner surface of freemixer 106 impinge on the inwardly curving boundary of the cascade 92. Since the cascade is of D-shaped cross-sectional geometry, i.e., the spaced-apart radially extending boundaries thereof join the inner, circumferentially extending boundary in a smoothly radiused manner, the impinging fluid streams flow smoothly around the cascade 92 (i.e., through the open regions 110 of FIG. 10) with minimum flow separation and pressure loss.

Although, as previously described, it is often advantageous to use circumferentially spaced-apart fan cascades to cause portions of the fan air to penetrate into the axially flowing primary stream and thereby induce portions of the primary stream to flow outwardly through the intervening regions between adjacent fan cascades, in some situations it can be advantageous to utilize primary cascades without utilizing fan cascades. In particular, although higher pressure losses are generally associated with redirecting the higher velocity primary flowstream and the relatively high temperature of the primary fluid flow often necessitates the use of rather heavy steel alloys, the relatively high velocity primary stream can be made to penetrate the lower velocity fan air somewhat more easily. Specifically, redirection of the primary fluid stream can often be effected by primary cascades that are somewhat smaller than the fan cascades that would be necessary to effect the same degree of fluid mixing. Thus, in some engine arrangements, the increased weight and pressure losses associated with the employment of primary cascades may be partially or totally offset by the smaller structure required to redirect selected portions of the primary flowstream.

Figure 12A:
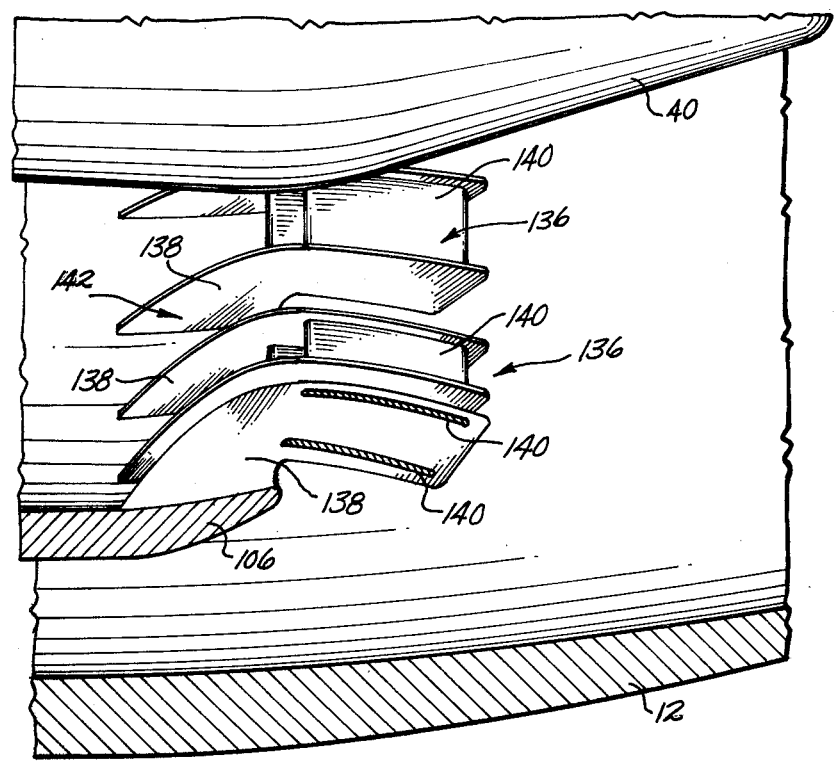
FIGS. 12a and 12b are respectively an axial cross-sectional view and a transverse cross-sectional view of an embodiment of the invention employing spaced-apart, axially extending primary cascades.
Figure 12B:
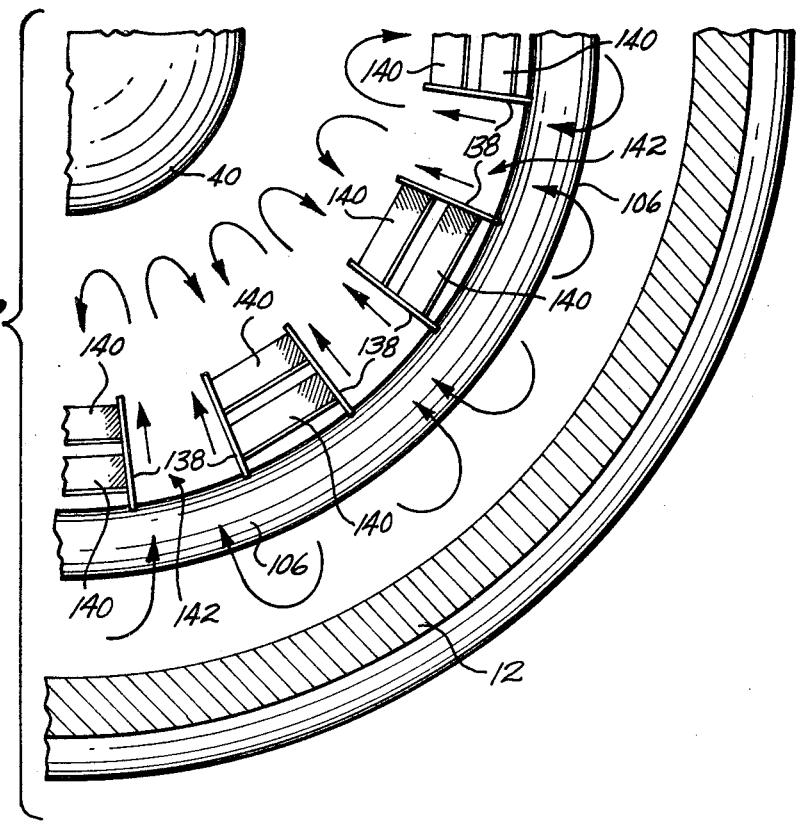

Such an embodiment of the invention is typified by the arrangement depicted in FIGS. 12a and 12b. Comparing the embodiment of the invention depicted in FIG. 12 with that embodiment depicted in FIGS. 10 and 11, the primary cascades 136 are structured substantially identical to the fan cascades 92 described relative to FIGS. 10 and 11. In the arrangement of FIG. 12, these primary cascades 136 project rearwardly from and are circumferentially spaced-apart around the inner surface of the free mixer 106. The forwardmost portion of each axial strongback 138 of the primary cascades 136 extends inwardly into the primary flow stream with the axial strongbacks 136 being curved such that the aftmost portion thereof projects outwardly beyond the outer surface of the free mixer 106. As in the arrangement of FIGS. 10 and 11, a pair of parallel spaced-apart deflection vanes 140 are mounted in transverse arrangement between alternate pairs of the circumferentially spaced-apart strongbacks. As can be understood upon viewing FIGS. 12a and 12B, the primary cascades intercept circumferentially spaced-apart regions of the primary flow, divert these regions of flow into the fan airstream and cause fan air to be induced inwardly through open regions 142 between adjacent primary cascades.

FIG. 13 depicts an alternative arrangement that can be employed as fan cascades or primary cascades in embodiments of the invention such as those depicted in FIGS. 10 through 12. The cascade 144 depicted in FIG. 13 includes a single strongback 146 which projects axially rearward from the aft terminus of the free mixer 106. In the arrangement of FIG. 13, the cascade 104 is a fan cascade; thus, as in the arrangements of FIGS. 10 and 11, the leading edge 150 of the strongback 146 is positioned within the fan airstream and, due to the curved geometry of the strongback, the aft edge thereof is positioned within the primary flowstream.

Deflection vanes 148, similar in geometry to the deflection vanes 134 and 140 of the previously described embodiments, project substantially orthogonally from each side surface of the strongback 146. Generally, the deflection vanes 148 project outwardly an equal distance from each side surface of the strongback 146. Further, the deflection vanes 148 generally have a radius of curvature such that, relative to the transverse direction, the deflection vanes 148 form spaced-apart segments of concentric circles.

Thus, as in the fan cascades 92 of the embodiments depicted in FIGS. 9 through 11, each cascade 144 of FIG. 13 causes radially spaced-apart, axially extending portions of the fan airstream to penetrate the rearwardly flowing primary flowstream. As previously described, flow displacement, caused by injection of portions of the fan stream into the primary flowstream, induces portions of the primary flowstream to flow radially outwardly through the open regions between adjacent cascades 144.

It will be recognized that, although FIG. 13 depicts a cascade 144 for diverting portions of the fan stream, the arrangement of FIG. 13 can be utilized to realize primary cascades such as the cascades 136 of FIG. 12 by suitably configuring the cascade 144 to divert regions of the primary flowstream into the rearwardly flowing fan stream.

Viewing the embodiments depicted in FIGS. 10–13, it can be recognized that realizations of these embodiments can often be shorter in axial length and lighter in weight than realizations of the embodiments depicted in FIGS. 2-9. Such embodiments are, of course, most useful in situations in which little space is available for the mounting of a mixer assembly. As described relative to the embodiments of FIGS. 2-9, the mixers of FIGS. 10-13 are arranged in view of the degree of mixing to be effected and the structural geometry of the duct region in which the mixer is mounted. In this respect, although the mixers of FIGS. 10-13 depict two deflection vanes within each of the cascades, as few as one vane or as many as eight or ten may be advantageous under various conditions. Generally speaking, the number of deflection vanes is directly related to the chord length of the vanes. Thus, embodiments employing relatively long vanes generally utilize fewer deflection vanes, e.g., the embodiments of FIGS. 10 and 11, whereas embodiments utilizing deflection vanes having a relatively short chord length generally employ a larger number of vanes, e.g., the embodiments of FIGS. 2-4. Further, when two or more vanes are employed within each cascade, the spacing between adjacent deflection vanes (i.e., the height of the channel formed between adjacent vanes), is generally established equal to or less than the chord length of the deflection vanes.

In view of the structural relationship discussed above, it can be further recognized that a further reduction in the axial length of the mixer can be achieved by cascades employing a relatively large number of deflection vanes of relatively short chord length wherein the cascades project radially into the flow streams to a greater extent than depicted in the embodiments of FIGS. 10-13. Two such variations in the invention are depicted in FIGS. 14 and 15. Since embodiments of the invention such as those depicted in FIGS. 14 and 15 do not cause the deflected fluid streams to exhibit the degree of radial penetration that is exhibited by the embodiments of the invention depicted in FIGS. 10-13, it is generally necessary to arrange the cascades for diversion of both the primary and fan air fluid streams to thereby provide substantial vortical flow regions.

Figure 14A:
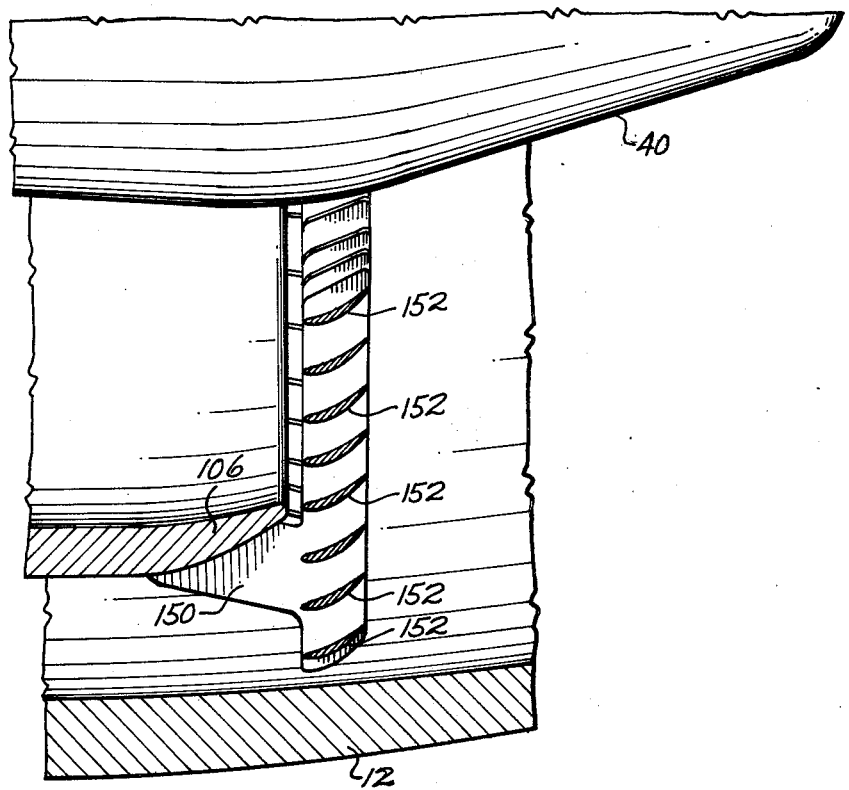
FIGS. 14a and 14b are respectively an axial cross-sectional view and a transverse cross-sectional view of an embodiment of the invention having cascades extending radially into both the fan on primary flowstreams.
Figure 14B:
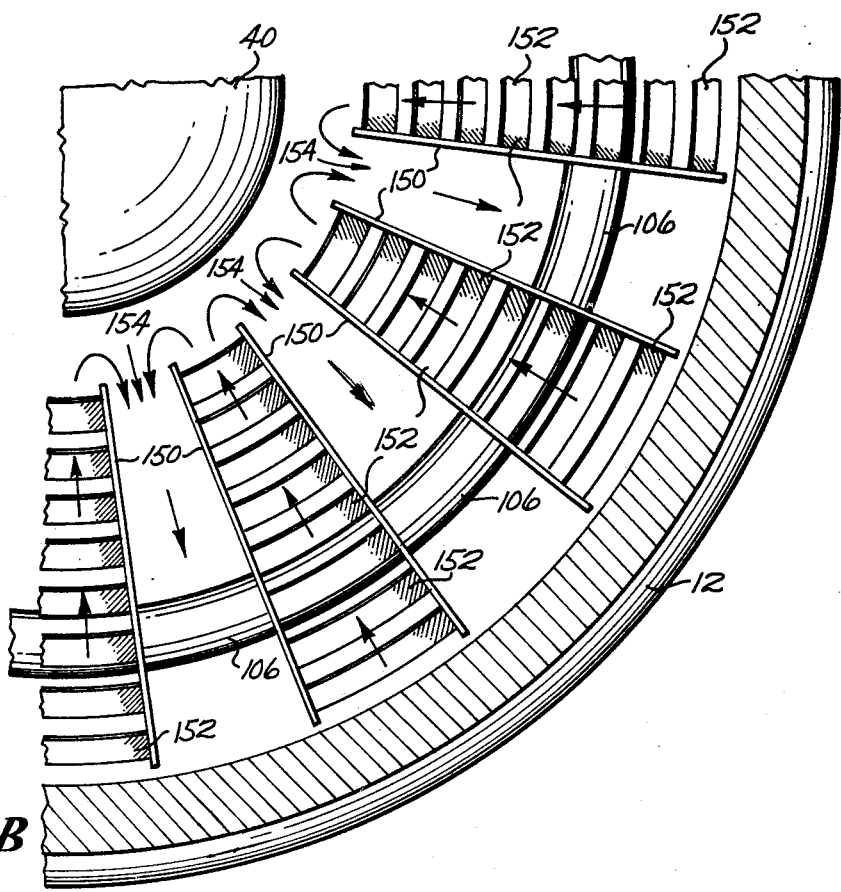
Figure 15A:
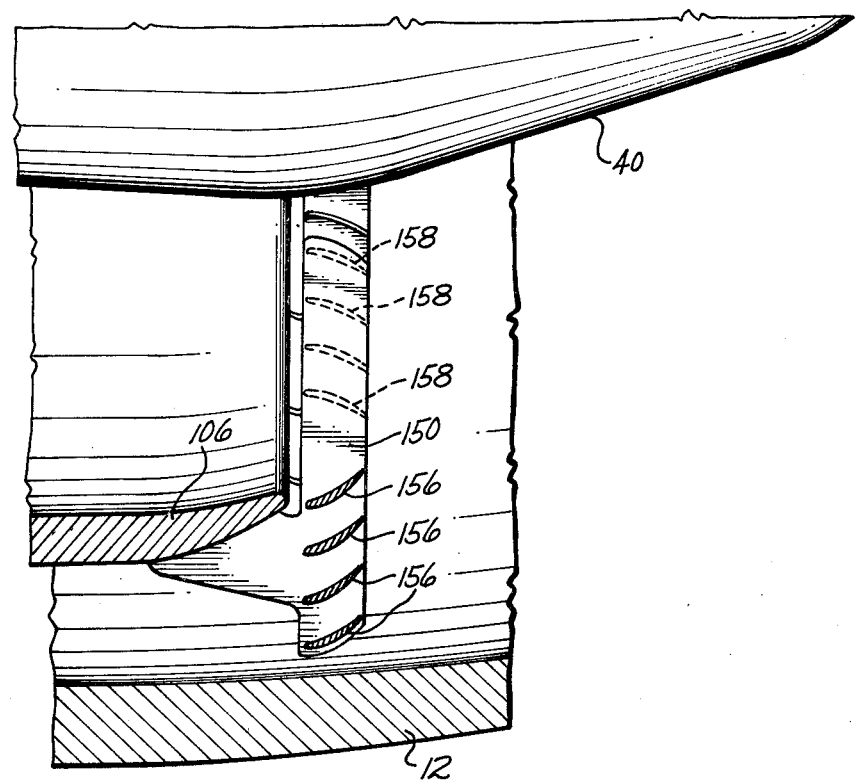
FIGS. 15a and 15b are respectively an axial cross-sectional view and a transverse cross-sectional view of an embodiment of the invention having radially extending, circumferentially interspersed primary and fan cascades.
Figure 15B:
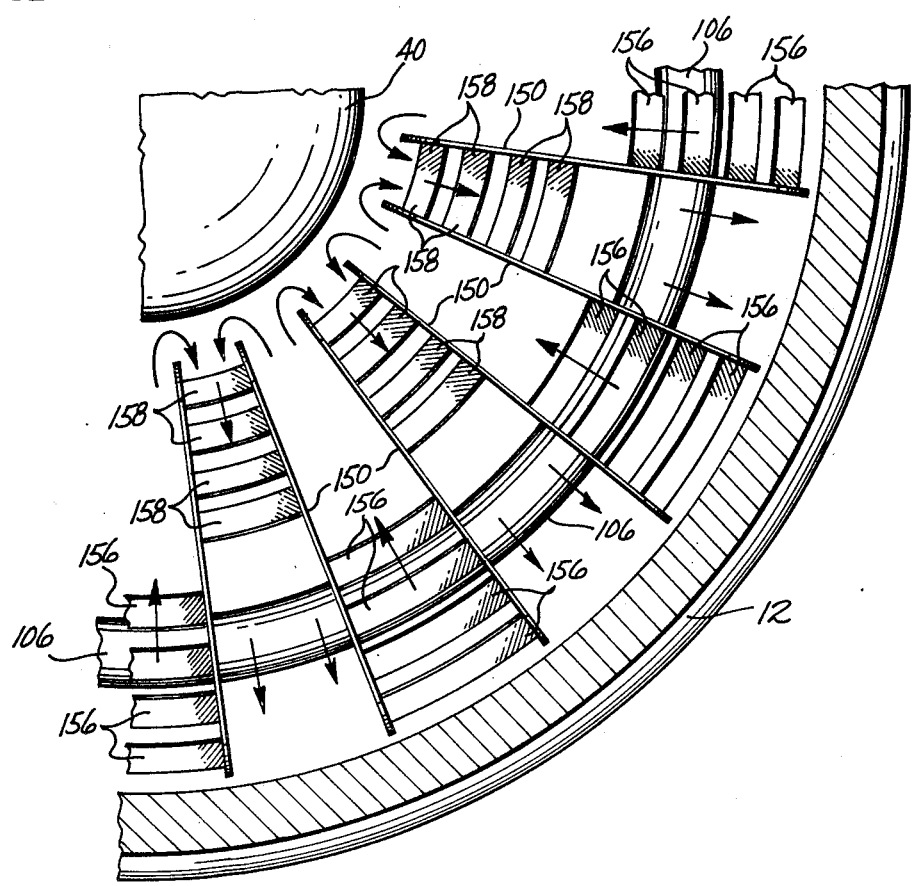

In the arrangement of FIGS. 14a and 14b, a number of circumferentially spaced apart strongbacks 150 project axially from the free mixer 106 and extend radially into both the primary fluid stream and the fan air stream. A plurality of deflection vanes 152 of relatively short chord length are mounted in alternate open regions defined between the strongbacks 150, with the spacing between adjacent deflection vanes 152 being on the order of the chord length of each individual deflection vane. As can be seen in FIG. 14a, each deflection vane 152 is canted for inward deflection of the intercepted regions of both the primary flow stream and the fan air stream. As is best illustrated by the arrows of FIG. 14b, this inward deflection of the fluid streams causes vortical flow regions near the surface of the tail plug 40 to, in turn, cause outward flow of the primary flow stream through undiverted regions of the fluid flow passing through the open regions 154 that are interspersed between adjacent cascades. As in the case of the previously described embodiments, the fluids continue to mix with one another as they flow rearwardly from the aft terminus of the mixer, with such mixing due to the induced substantial vortical flow regions, the induced radial flow shear and the axial flow shear arising from the difference in flow velocity between the two fluid streams.

The arrangement of FIG. 15 is similar to that of FIG. 14 in that strongbacks 150 project axially rearward from the free mixer 106 and extend radially into both the primary flow stream and the fan air stream, i.e., radially toward the plug 40 and the inner wall of the outer duct 12. In this case, however, deflection vanes 156 are mounted in alternate open regions defined between the circumferentially spaced apart strongbacks 150 for the inward deflection of the fan air stream and deflection vanes 158 are mounted in the alternately interspersed open regions for the outward deflection of the primary flow stream. Thus, in a manner similar to the embodiments of FIGS. 2-4, fan cascades and primary cascades are arranged in circumferential alternation to divert portions of one of the fluid streams into undiverted regions of the other fluid stream to thereby establish vortical flow regions and radial shear flow regions, which in combination with the axial shear flow resulting from the difference in velocity between the two fluid streams, causes thorough mixing of the fluids as the fluids pass rearwardly from the mixer.

It will be recognized by those skilled in the art that the disclosed embodiments in the invention and the variations discussed herein are exemplary in nature. In this respect, those skilled in the art will recognize that other variations fall within the scope and spirit of the invention. For example, with respect to the arrangement of FIG. 14 wherein the circumferentially spaced apart regions of the two fluid streams are diverted inwardly to induce outward flow of undiverted regions of the fluid streams, those skilled in the art will recognize that the described vortical flow regions, radial shear flow regions and axial shear flow can alternatively be effected by arranging the deflection vanes for outward diversion of both fluid streams. Further, although each embodiment depicts the strongbacks as depending from the aft region of the free mixer, the strongbacks can alternatively be supported by suitable structure connected to the engine tail cone and/or the outer duct. In such an arrangement, provision must generally be included to compensate for thermal gradients and the thermal coefficient of expansion of the various structural components.

What is claimed is:

1. Mixing apparatus for mixing first and second fluid streams with one another wherein said first fluid stream flows through an inner duct and said second fluid stream flows through an annular passageway formed between said inner duct and an outer duct that coaxially surrounds said inner duct, the direction of fluid flow of said first and second fluid streams substantially being in the same axial direction relative to said coaxially arranged inner and outer ducts, said outer duct extending axially in the direction of fluid flow beyond the terminus of said inner duct to define a common duct for the mixing of said first and second fluid streams, said mixing apparatus comprising:

an annular free mixer mountable to said terminus of said inner duct to extend in said axial direction of fluid flow, said annular free mixer having a cross-sectional geometry at the forwardmost end thereof substantially corresponding to the cross-sectional geometry of said terminus of said inner duct, said annular free mixer having a smoothly contoured terminating edge for permitting those regions in said first and second fluid streams flowing contiguous with the boundaries of said free mixer to partially mix with one another as said contiguous regions flow past said terminating edge of said free mixer;

a plurality of axially extending members projecting rearwardly from said terminating edge of said free mixer, said plurality of axially extending members being circumferentially spaced-apart from one another along said terminating edge of said annular free mixer, said plurality of axially extending members defining a plurality of axially extending open regions between adjacent ones of said axially extending members, said plurality of axially extending members being configured and arranged to define the transverse cross-sectional geometry of said plurality of open regions as segments between two concentric, geometric closed curves with each of said axially extending members forming a boundary wall that separates one of said open regions from an adjacent one of said open regions to thereby collectively define said plurality of open regions;

means for inducing a component of outward radial flow of said first fluid stream through a first plurality of said axially extending open regions and for inducing a component of inward radial flow of said second fluid stream through a second plurality of said axially extending open regions, said radially induced flow of said first fluid stream penetrating into said second fluid stream and said radially induced flow of said second fluid stream penetrating into said first fluid stream, individual open regions of said first plurality of open regions for outward radial flow of said first fluid stream being interspersed in circumferential alternation with individual open regions of said second plurality of open regions for inward radial flow of said second fluid stream, said means for inducing said radial flow of said first and second fluid streams including a plurality of deflection vanes mounted transversely within individual open regions of at least one of said first and second pluralities of axially extending open regions, said plurality of deflection vanes mounted within said individual open regions to extend between adjacent ones of said circumferentially spaced-apart, axially extending members, said deflection vanes being spaced-apart from one another along said axially extending members and canted relative to the axial flow direction of said first and second fluid streams, said deflection vanes being canted to expose the forwardmost boundary of each of said deflection vanes with that one of said first and second fluid streams being induced to include a radial flow component.

2. The mixing apparatus of claim 1 wherein each of said circumferentially spaced-apart, axially extending members is a generally flat plate having first and second longitudinal edges extending axially in the direction of said fluid flow, each of said individual open regions of said first and second plurality of circumferentially interspersed, axially extending open regions being defined between mutually opposed surfaces of two adjacent ones of said circumferentially spaced-apart plates, and wherein said first plurality of deflection vanes is mounted transversely in the individual open regions of each deflection vane of said plurality of open regions for inducing an outward radial flow component to intercepted portions of said first fluid stream flowing contiguously along said first plurality of open regions, said deflection vanes contoured and arranged for diverting said intercepted regions of said first fluid stream for penetration of said second fluid stream, said penetration of said second fluid stream inducing regions of said second fluid stream flowing contiguously along said second plurality of axially extending open regions to flow radially outward through said second plurality of open regions.

3. The mixing apparatus of claim 2 wherein forwardmost predetermined portion of the axial length of each of said axially extending members is configured to extend said first longitudinal edge radially inward into said first fluid stream by an increasing radial distance relative to said direction of fluid flow and is configured within the remaining axial length of said axially extending member to extend said first longitudinal edge radially outward toward said second fluid stream, said deflection vanes being mounted in spaced-apart relationship with one another between those mutually opposed surfaces of said circumferentially spaced-apart, axially members that define said individual openings of said first plurality of open regions, the foremost boundaries of said deflection vanes being positioned for receiving circumferentially spaced-apart regions of said first fluid stream, said spaced-apart deflection vanes defining at least one fluid passage between adjacent ones of said spaced-apart deflection vanes and those mutually opposed surfaces of said axially extending members that define the individual open region within which said deflection vanes are mounted, said deflection vanes being arcuate relative to the direction of fluid flow to curve each fluid passage outwardly towards said second fluid stream, said deflection vanes each having a chord length for establishing the length of each fluid passage to discharge said received portions of said first fluid stream rearwardly and radially outward into contiguous regions of said second fluid stream.

4. The mixing apparatus of claim 1 wherein each of said circumferentially spaced-apart, axially extending members is a generally flat plate having first and second longitudinal edges extending axially in the direction of said fluid flow and a terminating edge oriented transverse to said direction of fluid flow, each of said individual open regions of said first and second plurality of circumferentially interspersed, axially extending open regions being defined between mutually opposed surfaces of two adjacent ones of said circumferentially spaced-apart plates, and wherein said plurality of deflection vanes is mounted transversely in the individual open regions of said second plurality of open regions for inducing an inward radial flow component to intercepted portions of said second fluid stream flowing contiguously along said second plurality of open regions, said deflection vanes being contoured and arranged for causing said intercepted regions of said second fluid stream to penetrate said first fluid stream, said penetration of said first fluid stream inducing regions of said first stream flowing contiguously along said first plurality of axially extending open regions to flow radially outward through said first plurality of open regions.

5. The mixing apparatus of claim 4 wherein a forwardmost predetermined portion of the axial length of each of said axially extending members is configured to extend said first longitudinal edge radially outward into said second fluid stream by an increasing radial distance relative to said direction of fluid flow and is configured within the remaining axial length of said axially extending member to extend said first longitudinal edge radially inward toward said first fluid stream, said deflection vanes being mounted in spaced-apart relationship with one another between those mutually opposed surfaces of said circumferentially spaced-apart, axially extending members that define said individual openings of said second plurality of open regions, the forwardmost boundaries of each of said deflection vanes being positioned for receiving circumferentially spaced-apart regions of said second fluid stream, said spaced-apart deflection vanes defining at least one fluid passage between adjacent ones of said spaced-apart deflection vanes and those mutually opposed surfaces of said axially extending members that define the individual open region within which said deflection vanes are mounted, said deflection vanes being arcuate relative to the direction of fluid flow to curve each fluid passage inwardly toward said first fluid stream, said deflection vanes each having a chord length for establishing the length of each fluid passage to discharge said received portions of said second fluid stream rearwardly and radially inwardly into contiguous regions of said second fluid stream.

6. Mixer apparatus for use in combination with a gas turbine engine of the turbofan variety, said turbofan engine including a first fluid duct mounted coaxially within a second fluid duct, said second fluid duct extending rearwardly beyond the aft terminus of said first fluid duct to form a common exhaust duct wherein the primary fluid stream of said turbofan engine passes rearwardly through said first fluid duct and the secondary fluid stream of said turbofan engine passes into said common exhaust duct through the annular passage formed between said first and second fluid ducts, said primary and secondary fluid streams passing rearwardly through said common exhaust duct for discharge into the atmosphere, said mixer apparatus comprising:

an annular free mixer defining a rearward extension of said first fluid duct, said annular free mixer having a smoothly contoured aft terminus for the free mixing of portions of said primary and secondary fluid streams flowing contiguous to the boundaries of said annular free mixer as said primary and secondary fluid streams flow rearwardly across said aft terminus of said free mixer;

a plurality of support members mounted to extend rearwardly from said aft terminus of said free mixer, said support members being circumferentially spaced apart from one another around the periphery of said annular free mixer, said support members dividing at least a portion of said primary fluid stream and at least a portion of said secondary fluid stream into a plurality of first and second flow regions, each of said first flow regions including that portion of said primary fluid stream flowing in the intervening region between two adjacent ones of said spaced-apart support members, each of said second flow regions including that portion of said secondary fluid stream flowing in the intervening region between two adjacent ones of said spaced-apart support members, each of said support members including an inner and outer edge with the inner and outer edges of said support members being positioned coincident with first and second concentric circles relative to a transverse cross-sectional view of said mixer apparatus; and a plurality of deflection vanes mounted between adjacent ones of said spaced apart support members, each deflection vane of said plurality of deflection vanes mounted and arranged to intercept flow of one of said first and second flow regions to radially divert said intercepted flow into a region of the other one of said primary and secondary fluid streams that flow contiguous with said intervening region defining said intercepted fluid region, said intercepted fluid flow being radially diverted to effect flow displacement and vortical flow within said region of said other fluid stream flowing contiguous with said intervening region defining said intercepted fluid region, said flow displacement and said vortical flow for inducing radial flow within said fluid stream to mix said primary and secondary fluid streams with one another.

7. The mixer apparatus of claim 6 wherein at least one deflection vane of said plurality of deflection vanes is mounted in each of said intervening regions defining said second plurality of flow regions, said first plurality of flow regions being open flow regions interspersed in circumferential alternation with said first plurality of flow regions, each of said deflection vanes being canted relative to the direction of fluid flow to radially divert said intercepted fluid flow of said secondary fluid stream, each of said deflection vanes being of arcuate contour relative to a direction transverse to said direction of fluid flow to position the boundary of each of said deflection vanes on a circle concentric with said first and second circles.

8. The mixer apparatus of claim 7 wherein at least two of said deflection vanes are mounted in each of said intervening regions defining said second plurality of flow regions, said deflection vanes mounted within each of said intervening regions being spaced-apart from one another by a distance not exceeding the length of said deflection vane relative to said direction of fluid flow.

9. The mixer apparatus of claim 6 wherein at least one of said plurality of deflection vanes is mounted in each of said intervening regions defining said first plurality of flow regions, said second plurality of flow regions being open flow regions interspersed in circumferential alternation with said second plurality of flow regions, each of said deflection vanes being arranged relative to the direction of fluid flow to radially divert said intercepted fluid flow of said primary fluid stream, each of said deflection vanes being of arcuate contour relative to a direction transverse to said rearward direction of fluid flow to position the boundary of each of said deflection vanes on a circle concentric with said first and second circles.

10. The mixer apparatus of claim 9, wherein at least two of said deflection vanes are mounted in each of said intervening regions defining said first plurality of flow regions, said deflection vanes mounted within each of said intervening regions being spaced-apart from one another by a distance not exceeding the length of said deflection vanes relative to said rearward direction of fluid flow.

11. The mixer apparatus of claim 6 wherein each of said support members is a relatively flat plate, said inner edge of each of said support members extending progressively deeper into said primary fluid stream relative to said rearward direction of fluid flow over at least a portion of the axial length of said support members, said mixer apparatus including at least two of said deflection vanes mounted between each adjacent pair of said support members that define each of said first flow regions, said deflection vanes have arcuate contour relative to said rearward direction of said fluid flow, said deflection vanes being spaced-apart from one another and canted relative to said rearward direction of fluid flow to direct portions of said primary fluid stream flowing through said first plurality of flow regions radially outward into regions of said secondary fluid stream flowing contiguously with said intervening regions defining said first plurality of flow regions.

12. The mixer apparatus of claim 6, wherein each of said support members is a relatively flat plate, said outer edge of each of said support members extending progressively deeper into said secondary fluid stream relative to said rearward direction of fluid flow over at least a portion of the axial length of said support members, said mixer apparatus including at least two of said deflection vanes mounted between each adjacent pair of said support members that define each of said second flow regions, said deflection vanes having an arcuate contour relative to said rearward direction of fluid flow, said deflection vanes being spaced-apart from one another and canted relative to said rearward direction of fluid flow to direct portions of said secondary fluid stream flowing through said second plurality of flow regions radially inward into regions of said primary flow stream for flowing contiguously with said intervening regions defining said second plurality of flow regions.

* * * * *

UNITED STATES PATENT AND TRADEMARK OFFICE
CERTIFICATE OF CORRECTION

PATENT NO. : 4,165,609

DATED : August 28, 1979

INVENTOR(S) : Peter K.C. Rudolph

It is certified that error appears in the above-identified patent and that said Letters Patent are hereby corrected as shown below:

Column 1, line 42: "directed" is changed to --directly--.

Column 22, line 19: "axially members" is changed to --axially extending members--.

Signed and Sealed this

Twentieth Day of November 1979

[SEAL]

Attest:

RUTH C. MASON
Attesting Officer

LUTRELLE F. PARKER
Acting Commissioner of Patents and Trademarks